US012074367B1

(12) United States Patent
Lukic

(10) Patent No.: US 12,074,367 B1
(45) Date of Patent: Aug. 27, 2024

(54) WIDEBAND MULTIPLE-INPUT MULTIPLE-OUTPUT ANTENNA ARRAY WITH TAPERED BODY ELEMENTS

(71) Applicant: Maxtena, Inc., Rockville, MD (US)

(72) Inventor: Milan Lukic, Rockville, MD (US)

(73) Assignee: Maxtena, Inc., Germantown, MD (US)

( * ) Notice: Subject to any disclaimer, the term of this patent is extended or adjusted under 35 U.S.C. 154(b) by 386 days.

(21) Appl. No.: 16/949,351

(22) Filed: Oct. 26, 2020

Related U.S. Application Data

(62) Division of application No. 15/729,381, filed on Oct. 10, 2017, now Pat. No. 10,819,027.

(60) Provisional application No. 62/407,030, filed on Oct. 12, 2016.

(51) Int. Cl.

| | |
|---|---|
| ***H01Q 1/52*** | (2006.01) |
| ***H01Q 1/36*** | (2006.01) |
| ***H01Q 1/48*** | (2006.01) |
| ***H01Q 21/08*** | (2006.01) |
| ***H01Q 25/00*** | (2006.01) |
| *H01Q 1/32* | (2006.01) |

(52) U.S. Cl.
CPC ............... *H01Q 1/523* (2013.01); *H01Q 1/36* (2013.01); *H01Q 21/08* (2013.01); *H01Q 25/00* (2013.01); *H01Q 1/32* (2013.01); *H01Q 1/48* (2013.01)

(58) Field of Classification Search
CPC ...... H01Q 1/32; H01Q 1/3216; H01Q 1/3275; H01Q 1/36; H01Q 1/52; H01Q 1/521; H01Q 1/523; H01Q 1/525; H01Q 3/01; H01Q 9/30; H01Q 9/36; H01Q 9/38; H01Q 9/40; H01Q 9/46; H01Q 21/08; H01Q 21/28; H01Q 25/00
See application file for complete search history.

(56) References Cited

U.S. PATENT DOCUMENTS

| | | | |
|---|---|---|---|
| 2,175,252 | A | 6/1937 | Carter |
| 6,268,834 | B1 | 7/2001 | Josypenko |
| 8,184,060 | B2 | 5/2012 | Du |
| 8,537,061 | B2 | 9/2013 | Corwin |
| 9,478,865 | B1 | 10/2016 | Willis |
| 10,116,056 | B2 | 10/2018 | Thiel |

(Continued)

OTHER PUBLICATIONS

Daniel W. Aten et al., A Wideband, Low Profile, Shorted Top Hat Monocone Antenna, IEEE Transactions on Antennas and Propagation, vol. 60, No. 10, Oct. 2012.

(Continued)

*Primary Examiner* — Robert Karacsony
(74) *Attorney, Agent, or Firm* — Patents and Licensing LLC; Daniel W Juffernbruch

(57) ABSTRACT

Wide band Multiple-Input Multiple-Output (MIMO) antenna arrays include elements that taper from small ends located proximate to ground planes to larger ends which may be extended with vertical walls. Different shapes of tapered elements which exhibit different directivity patterns may be used in the same array and/or elements may be oriented differently such that their directivity patters peak in different directions. Each element is provided with symmetrically or asymmetrically located ground shunted conductors which serve to increase non-uniformity in the azimuthal directivity patterns. The ground shunt conductors are strategically placed to reduce element intercoupling which foster improved MIMO system performance.

14 Claims, 21 Drawing Sheets

4500

(56) References Cited

U.S. PATENT DOCUMENTS

| | | | | |
|---|---|---|---|---|
| 2016/0233590 | A1 * | 8/2016 | Ng | H01Q 21/205 |
| 2017/0207539 | A1 | 7/2017 | Thiel | |

OTHER PUBLICATIONS

X. Chen et al, Super-wideband and Compact Omnidirectional Antenna with Simple Structure and Improved Radiation properties, International Journal of Microwave and Wireless Technologies, Cambridge University Press and the European Microwave Association, Published online by Cambridge University Press, Apr. 26, 2016.
HUBER+SUHNER Sencity Rail MIMO Antenna 1399.17.0135 Data Sheet two pages published Apr. 20, 2016.
HUBER+SUHNER Sencity Rail MIMO Antenna 1399.99.0130 Data Sheet two pages published May 20, 2016.
HUBER+SUHNER Test Report EN50124-1 40kA 70kA SenCity Rail MIMO GPS, 34 pages, unknown publication date, test date Aug. 7, 2013.
HUBER+SUHNER Test Report EN50124-1 40kA low profile MIMO, 26 pages, unknown publication date, test date May 13 and 14, 2014.

* cited by examiner 302, 308

302, 308

302, 308

302, 308

302, 308

1900 s1,1 (50Ohms)
s2,2 (50 Ohms)

2000

○ 500
● 6499.9995
Frequency / MHz 1 698.000000 ( 63.309119, 25.329990 ) Ohm
2 698.000000 ( 50.973889, -31.131092 ) Ohm

PDF: "ELEMENT 3"

2700

2800

2900

F=800 MHz

Main Lobe 5.75 dBi

PDF: "ELEMENT 3B"

3000

3300

3400

4000

4100

4400

4500

4900

5000

WIDEBAND MULTIPLE-INPUT MULTIPLE-OUTPUT ANTENNA ARRAY WITH TAPERED BODY ELEMENTS

FIELD OF THE INVENTION

The present invention relates generally to wideband Multiple-Input, Multiple-Output (MIMO) antenna arrays.

BACKGROUND

Wireless connectivity for handheld and portable devices such as smartphones, laptop computers and tablet computers continues to spread throughout populated regions of the world. Public Wi-Fi is often available in indoor public places and outdoors people can rely on cellular data communications. However, cellular data communications have associated usage charges and cellular data service plans may stipulate monthly data caps beyond which additional data usage is substantially more costly.

While traveling on trains whether in the course of a daily commute or in the course of longer city-to-city trips it would be beneficial to have access to broad band data connectivity for business or entertainment. Unfortunately there have been certain impediments to providing broadband connectivity on trains. For one, the body of the train, being metal, reflects wireless signals which tends to impair stable wireless communication between users' devices inside of the train and cellular or Wi-Fi communication infrastructure outside the train. Additionally a train may traverse great distances passing through different regions and different countries where the frequency bands in use differ, and the cellular infrastructure uses communication standards that may differ from those standards supported by a particular user's communication device. Furthermore trains may traverse desolate areas where the only wireless communication infrastructure external to the train is that which is provided specifically for the train service and the frequency and communication standard may be proprietary and/or not supported by consumer devices. Thus in general in order to sustain communications from a train it may be necessary to operate in a wide range of different frequency bands.

One solution is to mount a wideband antenna on top of the train and connect the wideband antenna to one or more radios. The wideband attribute of the antenna allows for communication in a variety of different frequency bands associated with different communication protocols used in various areas that the train may traverse. In certain instances simultaneous communications on multiple different frequency bands may be sustained using the same wideband antenna. The aforementioned radio or radios could in turn connected to a wireless (e.g., Wi-Fi) router located inside the train. The radios and wideband antenna mounted on top of the train are used to establish communication with nearby wireless communication infrastructure such as cellular or Wi-Fi equipment that the train passes. Communications could be routed between the radios and wireless router inside the train thereby providing communication connectivity to passengers in the train. Because, there are likely to be a number of passengers inside the train who would like to use the provided wireless services, the bandwidth requirement is elevated. Multi-Input, Multi-Output (MIMO) communication systems can be use increase the effective data capacity of a given frequency band by exploiting multi-path effects to create a number of independent data channels between a given receiver and transmitter. In general the maximum number of independent channels that may be created is equal to minimum of the number of receive antenna elements and the number of transmit antenna elements, however attaining this maximum number of channels is not guaranteed even in a rich multipath environment. In order to achieve the theoretical maximum number of independent data channels, the elements of each MIMO antenna must be substantially decoupled from each other. Due to practical considerations the antenna element are typically housed in a common housing of limited dimension and the isolation must be achieved notwithstanding the close relative proximity of the antenna elements and sustained over the wide frequency range of the antenna elements. While adding more elements can theoretically increase the MIMO data bandwidth maintaining isolation as elements are added is challenging.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
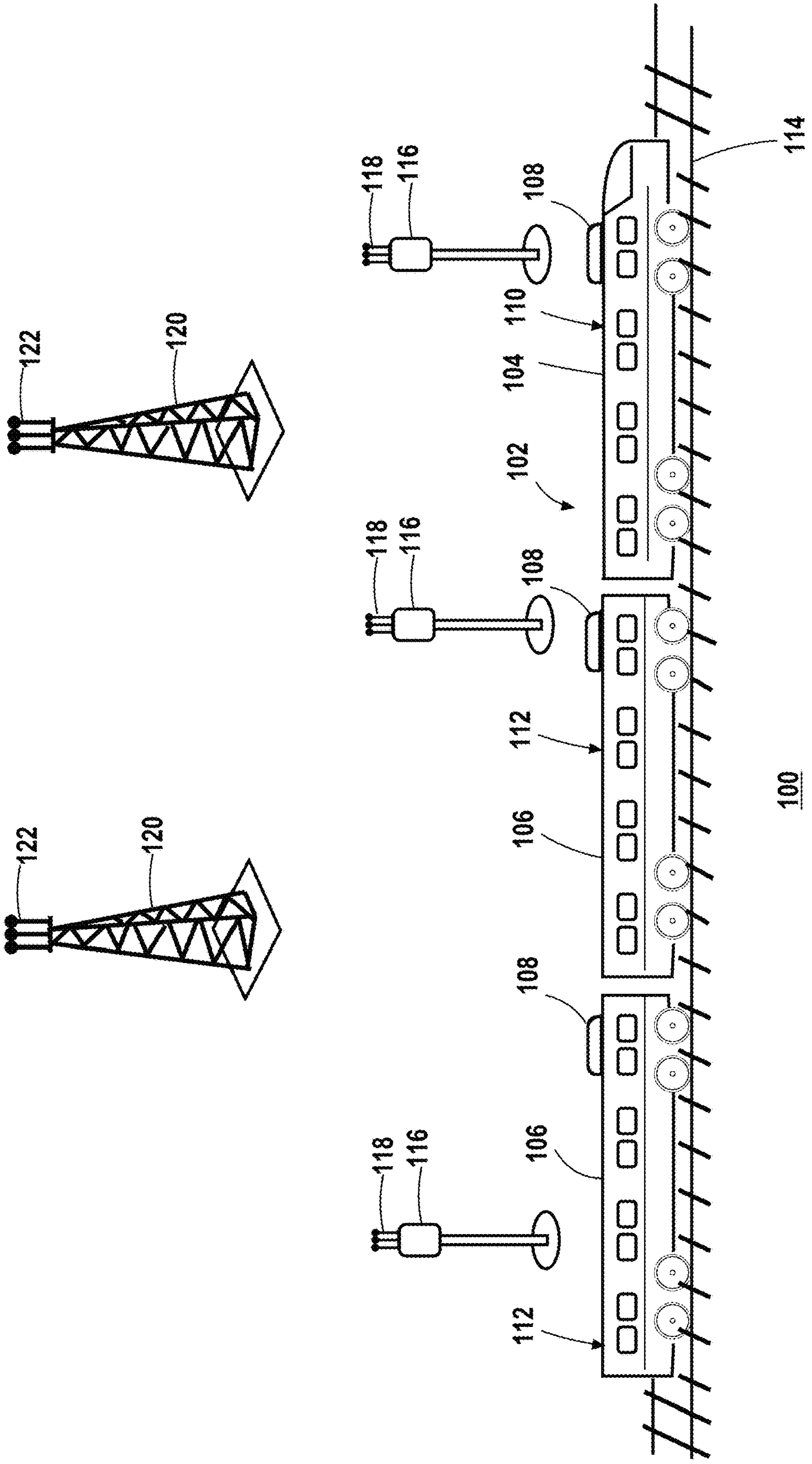
FIG. 1 is a schematic representation of a train communication system according to an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components related to wideband MIMO communications. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

FIG. 1 is a schematic representation of a train communication system 100 according to an embodiment of the invention. Note that although certain embodiments of the invention are described hereinbelow in the context of a train communication system, elements of the system including the wideband MIMO antenna arrays described herein can be adapted to other applications such as, for example, fixed terminal communications, land vehicle (e.g., bus) communication systems, maritime, (e.g., port) communication system, and airplane communication systems. Referring to FIG. 1, a train 102 includes an engine 104 and a plurality of train cars 106 (only two of which are shown for the purpose of illustration). A wideband MIMO antenna array 108 is mounted on a top surface 110 of the engine 104 and top surface 112 each of the train cars. The train 102 rides on a track 114.

A series of MIMO Wi-Fi communication transceivers 116 are located adjacent to the track 114. The MIMO Wi-Fi communication transceivers 116 are each communicatively coupled to a collocated Wi-Fi MIMO antenna array 118. The MIMO Wi-Fi communication transceivers 116 can alternatively utilize another wireless communication protocol other than Wi-Fi, such as for example WiMAX. In the vicinity of straight sections of track 114 the MIMO wireless communication transceivers 116 can be equipped with MIMO antenna arrays that have peak directivity aimed parallel to or approximately parallel to the track 114 with slightly varying aim direction. In such cases there may be expected to be multi-path channels associated with reflection and scattering from objects bounding the railroad right-of-way. In a MIMO communication system, such multipath channels can be exploited to increase data bandwidth of a given frequency band. Alternatively the MIMO wireless communication transceivers 116 can be spaced at a greater distance from the track 114 and in such case there may be multi-path channels established by the agency of reflection and scattering from objects encountered by waves traversing from the transceivers to wideband MIMO arrays 108 on the train 102. A plurality of cellular communications base stations 120 are also located in the vicinity of the train track 114. The cellular communication base stations 120 each are coupled to a cellular MIMO antenna array 122. The cellular MIMO antenna array 122 of a particular cellular communications base station 120 can be used in conjunction with one of the wideband MIMO arrays 108 on the train 102 to established MIMO communication links.

Figure 2:
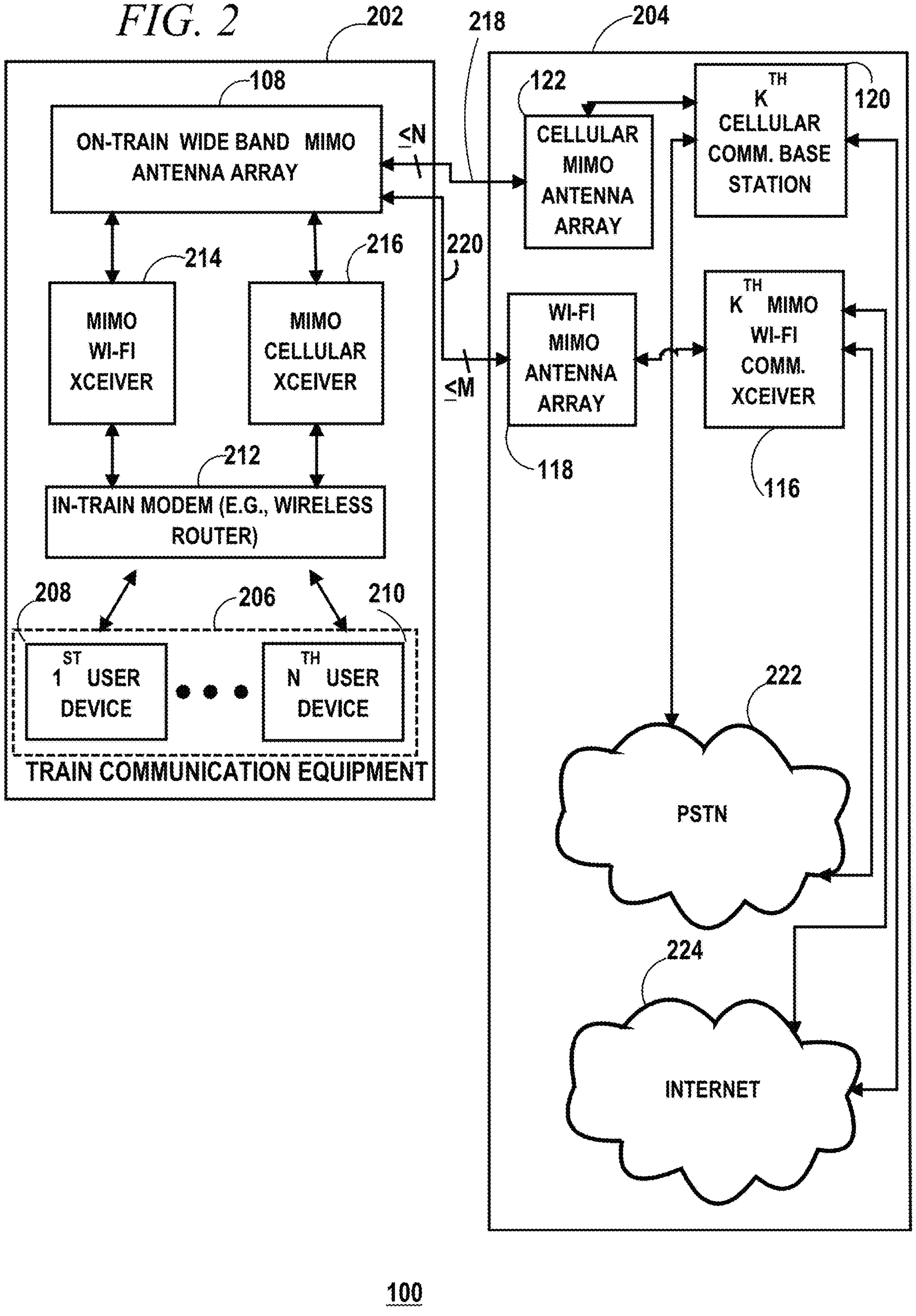
FIG. 2 is a block diagram of the train communication system shown in FIG. 1 according to an embodiment of the invention.

FIG. 2 is a block diagram of the train communication system 100 shown in FIG. 1 according to an embodiment of the invention. The train communication system 100 includes train communication equipment 202 and terrestrial communication equipment 204.

Nominally included in the train communication equipment 202 are a plurality of user devices 206 represented in FIG. 2 by a first user device 208 and an $N^{TH}$ user device 210. The user communication devices 206 may, for example, include smart phones, tablet computers equipped with Wi-Fi, and/or laptop computers equipped with Wi-Fi. The user communication devices 206 are communicatively coupled to an in-train modem (e.g., wireless router) 212. Transmission lines (e.g., Ethernet, fiber optic) can optionally also be provided between the user devices 204 and the in-train modem 212. The in-train modem 212 is communicatively coupled to a MIMO Wi-Fi transceiver 214 and to a MIMO cellular transceiver 216 which are in turn coupled to the on-train wideband MIMO antenna array 108. Note that the same train communication equipment 202 can be included in the engine 104 and in each of the plurality of train cars 106 of the train 102.

The terrestrial communication equipment 204 includes a plurality of the cellular MIMO antennas 122 (only one of which is shown in FIG. 2 for the purpose of illustration) each of which is communicatively coupled through a first multipath channel 218 to the on-train wideband MIMO antenna array 108. The terrestrial communication equipment 204 further includes a plurality of the Wi-Fi MIMO antenna arrays 122 (only one of which is shown in FIG. 2 for the purpose of illustration) each of which is communicatively coupled through a second multipath channel 220 to the on-train wideband MIMO antenna array 108. The second multipath channel 220 can alternatively be a MIMO WiMAX or other MIMO wireless communication channel. The cellular MIMO antennas 122 and the Wi-Fi MIMO antennas 118 may operate at different frequencies, however the wideband MIMO antenna array 108 by virtue of the wide bandwidth aspect is able to communicate with both terrestrial MIMO antennas 118, 122.

Each Wi-Fi MIMO antenna array 118 is communicatively coupled to an associated one of the MIMO Wi-Fi transceivers 116 (only one of which, denoted the $K_{TH}$ is depicted in FIG. 2 for the purpose of illustration). Each cellular MIMO antenna array 122 is communicatively coupled to an associated cellular communication base station 120 (only one of which, denoted the $K^{TH}$, is depicted in FIG. 2 for the purpose of illustration). Both the cellular communication base stations 120 and the MIMO Wi-Fi transceivers 116 are communicatively coupled to the Public Switched Telephone Network (PSTN) 222 and to the Internet 224. MIMO WiMAX or other MIMO wireless components may be used in lieu of the Wi-Fi components in the system 100.

Thus by the provision of the systems described above including the wideband MIMO antenna arrays 118 mounted on the train 102, passengers are able to enjoy the benefits of broadband connectivity while traveling on the train 102.

Figure 3:
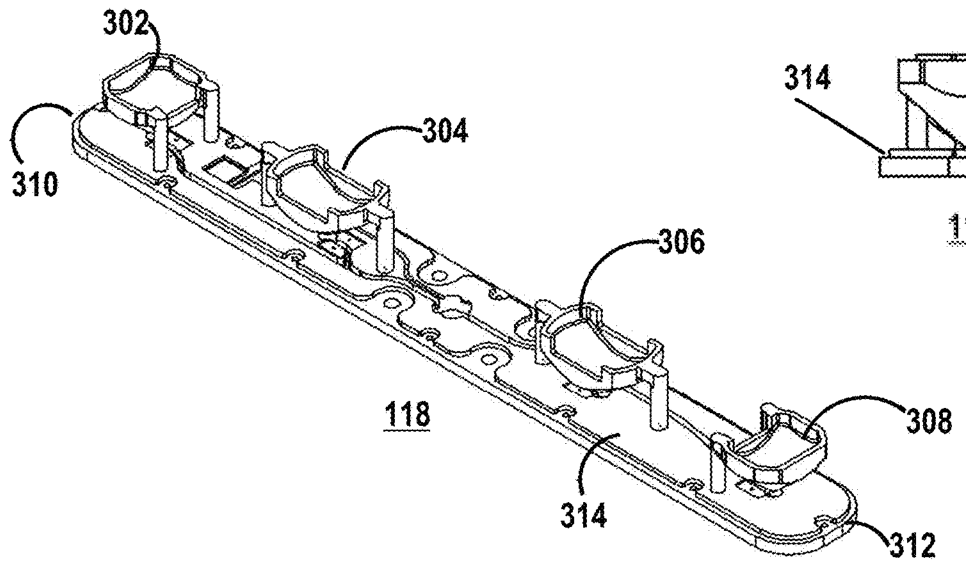
FIG. 3 is an isometric view of a wideband MIMO antenna array according to a first embodiment of the invention.
Figure 6:
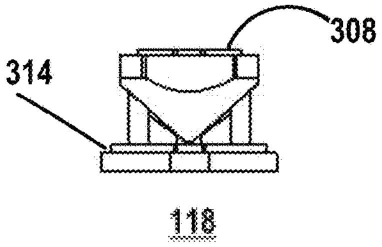
FIG. 6 is an end view of the MIMO antenna array shown in FIG. 3.
Figure 4:
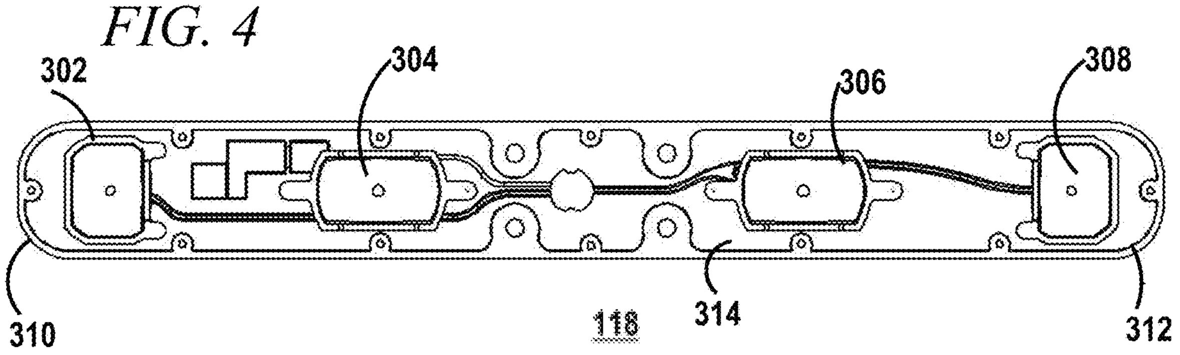
FIG. 4 is a top view of the MIMO antenna array shown in FIG. 3.
Figure 5:
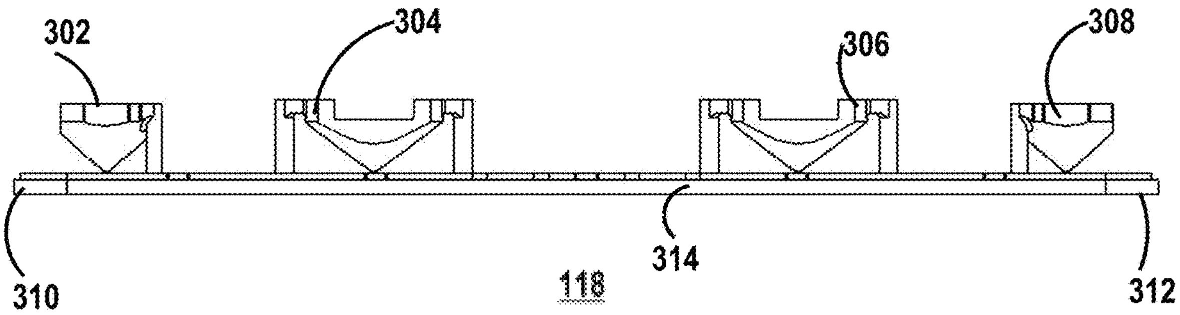
FIG. 5 is a front view of the MIMO antenna array shown in FIG. 3.

FIGS. 3-6 show different views of the wideband MIMO antenna array 118 according to a first embodiment of the invention. FIG. 3 is an isometric view, FIG. 4 is a top view, FIG. 5 is a front view; and FIG. 6 is an end view of the wideband MIMO antenna array 118. The array 118 is a linear array of four antenna elements 302, 304, 306, 308 arranged in a line, including a first first type antenna element 302 disposed at a first end 310 of the array 118 and a second first type antenna element 308 disposed at an second (opposite) end 312 of the array 118, a first second type antenna element 304 disposed at a first position between the first and second first type antenna elements 302, 308 and a second second type antenna element 306 disposed at a second position between the first second type antenna element 304 and the second first type antenna element 308. The array 118 further includes a ground plane 314 over which the four antenna elements 302, 304, 306, 308 are disposed. The antenna elements 302, 304, 306, 306 and the ground plane 314 are made of electrically conductive material such as, for example, aluminum or copper. A plastic radome (not shown) can be placed on the ground plane 314 over the antenna element 302, 304, 306, 308.

Figure 8:
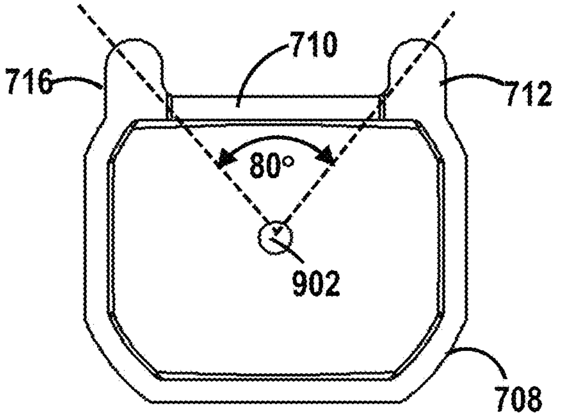
FIG. 8 is a top view of the first type of antenna element shown in FIG. 7.
Figure 7:
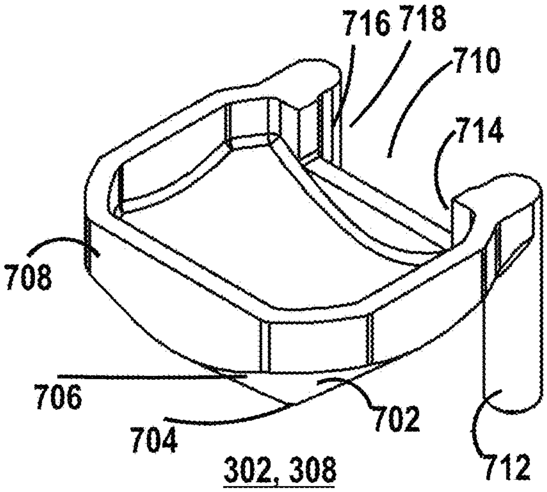
FIG. 7 is an isometric view of a first type of antenna element of the MIMO antenna array shown in FIGS. 3-6.
Figure 9:
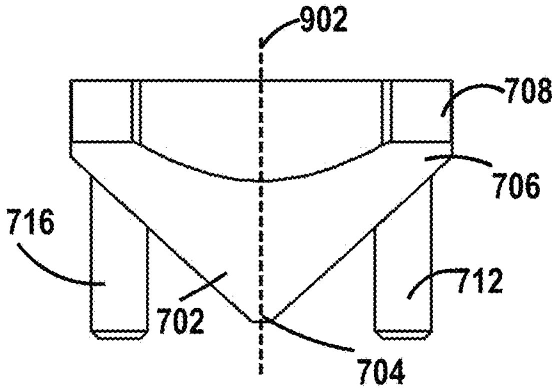
FIG. 9 is a front view of the first type of antenna element shown in FIG. 7.
Figure 10:
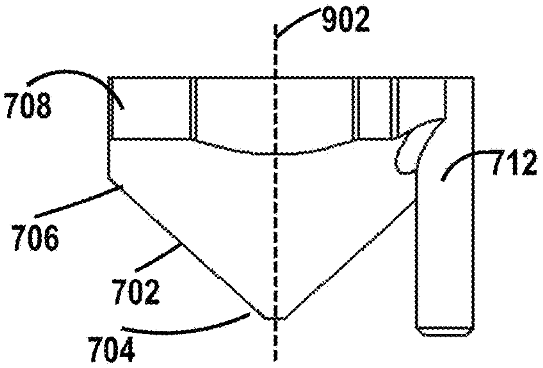
FIG. 10 is a side view of the first type of antenna element shown in FIG. 7.
Figure 11:
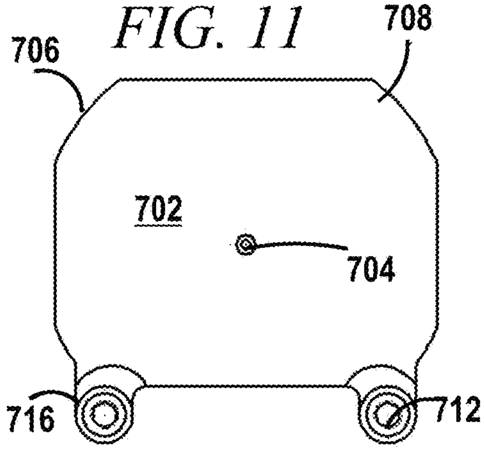
FIG. 11 is bottom view of the first type of antenna element shown in FIG. 7.

The details of the geometry of the first type antenna elements 302, 308 are shown in FIGS. 7-11, of which FIG. 7 is an isometric view, FIG. 8 is a top view, FIG. 9 is a front view, FIG. 10 is a side view, and FIG. 11 is bottom view. Referring to FIGS. 7-11 the first type antenna element 302, 308 includes a tapered (conical) portion 702 that includes a small end 704 (which when the first type antenna element 302, 308 is used in the wideband MIMO array 108 will be disposed proximate the ground plane 314) and a larger end 706. To feed the first type antenna elements 302, 208 (and other antenna elements disclosed herein) one terminal (e.g., inner conductor 5610, FIG. 56) of a feed cable (e.g., 5602, FIG. 56) is coupled to the small end 704 and one terminal (e.g., outer conductor 5608, FIG. 56) is coupled to the ground plane 314. A polygonal vertical wall portion 708 extends from the larger end 706 of the tapered portion 702 in the direction away from the small end 704. FIGS. 8-10 show a virtual vertical axis 902 of the antenna element 302, 308 which passes through the small end 704 of the tapered portion 702. A largest dimension of the tapered portion 702 measured in a plane traverse to the virtual vertical axis 902 increases from the small end 704 to the larger end 706. The polygonal vertical wall portion 708 extends only partly around (azimuthally with respect to the vertical axis 902) the first type antenna element 302, 308 leaving a gap 710. The gap 710 helps to reduce the directivity in an azimuthal angle range facing outward away from the gap.

According to one embodiment the width of the tapered portion 702 (the dimension measured horizontally in FIGS. 8, 9, 11) is 81 millimeters and the depth of the tapered portion 702 (the dimension measured vertically in FIGS. 8, 11) is 65 millimeters, so that the aspect ratio of the tapered portion (in the top view which is the width to depth ratio) is 1.246.

A first ground shunt conductor (post) 712 extends down from the vertical wall portion 708 adjacent a first end 714 of the gap 710 to the ground plane 314 (FIGS. 3-6). Similarly a second ground shunt conductor 716 extends down from the polygonal vertical wall portion 708 adjacent a second end 718 of the gap 710 to the ground plane 314 (FIGS. 3-6). In the wideband MIMO antenna array 108 the ground shunt conductors 712, 716 serve two purposes. One purpose is to provide a path to ground for accidental large electrical discharges emanating from high voltage power supply conduits used to supply motive power to the train 102 and to provide a ground path for lightning strikes. A second purpose, more relevant to the communication performance, is to alter the directivity pattern of the first type antenna element 302, 308 and to decouple the first type antenna element 302, 308 from other antenna elements 302, 304, 306, 308 in the wideband MIMO antenna array 108. Decoupling is imperative to realize the data bandwidth increase of a given frequency band which MIMO systems can, in principle, provide. As shown in FIG. 8 the ground shunt conductors 712, 716 are displaced from each other in azimuth angle with respect to the virtual vertical axis by about 80°. More generally, according to certain embodiments the two (or alternatively three or more) ground shunt conductors are within a 135 degrees angular range. Locating the ground shunt conductors 712, 716 asymmetrically with respect to the virtual vertical axis 902, e.g., on one side of the first type antenna element 302, 308 tends to reduce the directivity on the side of the first type antenna element on which the ground shunt conductors 712, 716 are placed and strengthen the directivity on the opposite side. By facing the angular range of the directivity pattern that is stronger away from other antenna elements 302, 304, 306, 308 in the array the parasitic coupling to those elements can be reduced and MIMO communication performance tends to increase.

Figure 13:
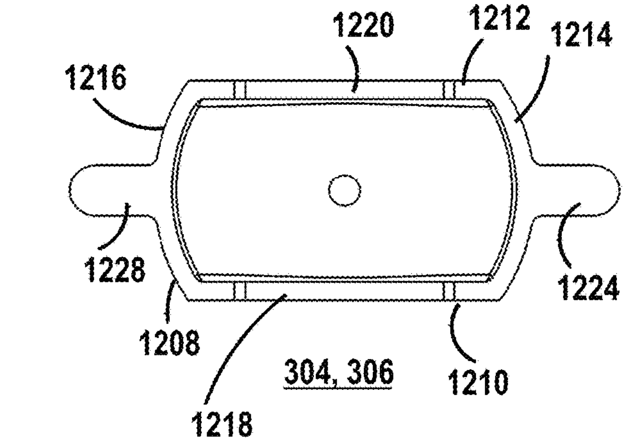
FIG. 13 is a top view of the second type of antenna element shown in FIG. 12.
Figure 12:
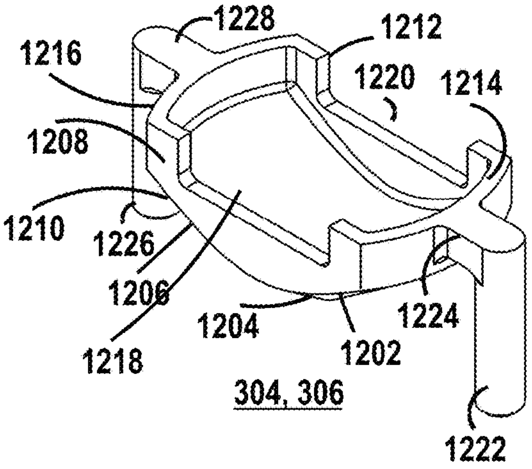
FIG. 12 is an isometric view of a second type of antenna element of the MIMO antenna array shown in FIGS. 3-6.
Figure 14:
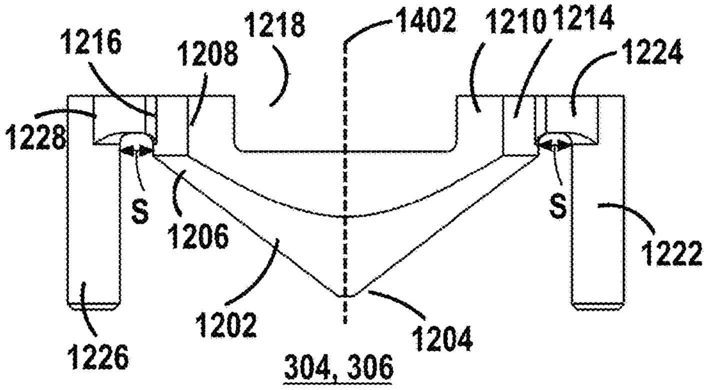
FIG. 14 is a front view of the second type of antenna element shown in FIG. 12.
Figure 15:
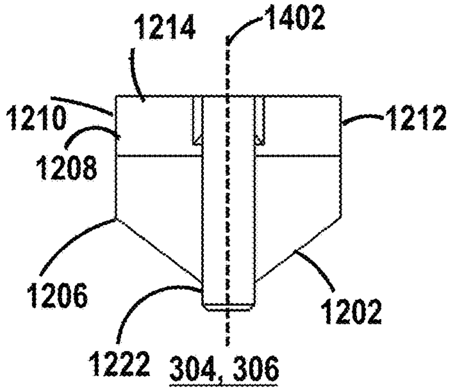
FIG. 15 is a side view of the second type of antenna element shown in FIG. 12.
Figure 16:
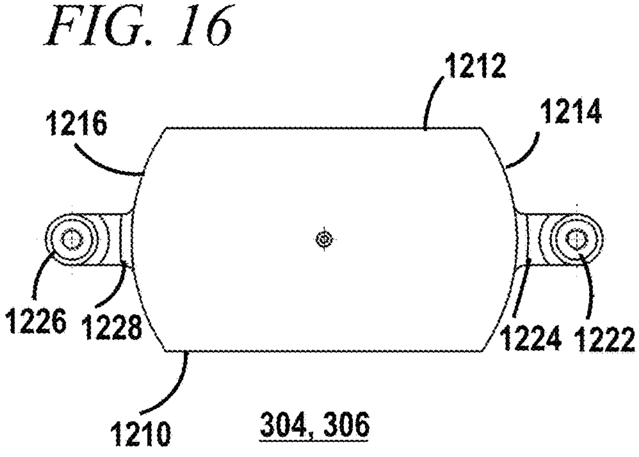
FIG. 16 is a bottom view of the second type of antenna element shown in FIG. 12.

The details of the geometry of the second type antenna elements 304, 306 are shown in FIGS. 12-16, of which FIG. 12 is an isometric view, FIG. 13 is a top view, FIG. 14 is a front view, FIG. 15 is a side view, and FIG. 16 is bottom view. Referring to FIGS. 12-16 the second type antenna element 304, 306 includes a tapered (conical) portion 1202 that includes a small end 1204 (which when the second type antenna element 304, 306 is used in the wideband MIMO array 108 will be disposed proximate the ground plane 314) and a larger end 1206.

FIGS. 14-15 show a virtual vertical axis 1402 of the second type antenna element 304, 306 which passes through the small end 1204 of the tapered portion 1202. A largest dimension of the tapered portion 1202 measured in a plane traverse to the virtual vertical axis 1202 increases from the small end 1204 to the larger end 1206.

A vertical wall 1208 extends from the larger end 1206. The vertical wall 1208 includes a first straight portion 1210 and a second straight portion 1212 that extend in a width direction of the second type antenna element 304, 306 on opposite sides (displaced from each other in a depth direction) of the second type antenna element 304, 306. The straight portions 1210, 1212 of the vertical wall 1208 are joined at one end of the second type antenna element 304, 306 by a first curved portion 1214 and are joined at an opposite end of the second type of antenna element 304, 306 by a second curved portion 1216. As shown for example in FIG. 13 the width of the second type antenna element 304, 306 (horizontal dimension in FIG. 13) exceeds the depth (vertical dimension in FIG. 13) of the second type antenna elements. According to certain embodiments the width is more than 1.5 times the depth. Making the second type antenna elements 304, 306 rotationally nonsymmetrical (non-axisymmetric) about the virtual vertical axis 1202 contributes to making the azimuthal directivity pattern rotationally nonsymmetrical.

According to one embodiment the width of the tapered portion 1202 (the dimension measured horizontally in FIGS. 13, 14, 16) is 104 millimeters and the depth of the tapered portion 1202 (the dimension measured vertically in FIGS. 13, 16) is 60 millimeters, so that the aspect ratio of the tapered portion (in the top view which is the width to depth ratio) is 1.733. It is noted that the aspect ratio of the tapered portion 702 of the first type antenna elements 302, 308 differs from the aspect ratio of the tapered portion 1202 of the second type of antenna elements 304, 306. The differences in aspect ratio contribute to some degree to the different azimuthal directivity patterns.

A first U-shaped notch 1218 is formed in the first straight portion 1210 and a second U-shaped notch 1220 is formed in the second straight portion 1212. Sizing the notches 1218, 1220 is used to increase the nonuniformity of the azimuthal directivity pattern.

A first vertical ground shunt conductor 1222 is connected by a first small horizontal bridge portion 1224 to the center of the first curved portion 1214 and extends down to the ground plane 314. A second vertical ground shunt conductor 1226 is connected by a second small horizontal bridge 1228 to the center of the second curved portion 1216 and also extends down to the ground plane 314. The first ground shunt conductor 1222 and the second ground shunt conductor 1226 are displaced in the width direction and centered in the depth direction of the second type antenna element 304, 306. The vertical ground shunt conductors 1222, 1226 help to reduce the directivity along the width direction of the second type antenna elements 304, 306. In the wideband MIMO array 108 the second type antenna elements 304, 306 are arranged so that the vertical ground shunt conductors are positioned facing adjacent antenna elements 302, 304, 306, 308. This arrangement reduces the coupling between each of the second type antenna elements 304, 306 and other antenna elements 302, 304, 306, 308 of the wideband MIMO array 108. In the embodiment shown in FIGS. 12-16 the small horizontal bridge portions 1224, 1228 space the vertical ground shunt conductors 1222, 1226 away from the curved portions 1214, 1216 by a distance S (FIG. 14) of 9 millimeters. More generally according to certain embodiments the distance S is at least 5 millimeters. As in the case of the first type of antenna element 302, 308 another purpose of the ground shunt conductors 1222, 1226 is to provide a path to ground for accidental large electrical discharges emanating from high voltage power supply conduits used to supply motive power to the train 102 or lightning strikes.

Figure 17:
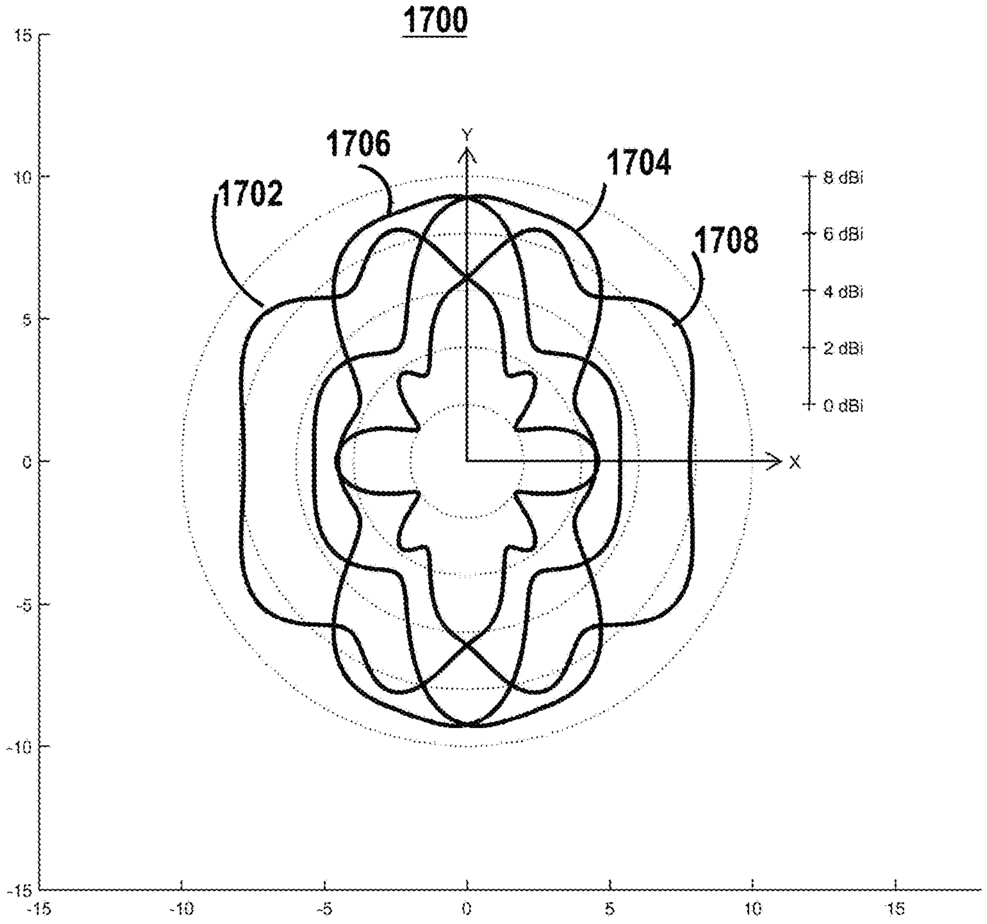
FIG. 17 is a graph including directivity polar plots for the four antenna elements of the MIMO antenna array shown in FIGS. 3-6.

FIG. 17 is a graph 1700 including directivity polar plots 1702, 1704, 1706, 1708 for the four antenna elements 302, 304, 306, 308 of the MIMO antenna array 108 shown in FIGS. 3-6. The plots 1702, 1704, 1706, 1708 show directivity as a function of azimuth angle in an X-Y plane at a zenith angle of 90°. The zenith angle is measured from a Z-axis (not shown) which is aligned with virtual vertical axes 902, 1402 (FIGS. 9-10, 14-15). It should be noted that the directivity plots 1702, 1704, 1706, 1708 show the directivity when the antenna elements 302, 304, 306, 308 are installed in the array 108 and differ from what they would be if the elements were operated in isolation. The X-axis of the graph 1700 corresponds to the longitudinal axis of the array (which extends from the first end 310 to the second end 312). Plot 1702 is for the first first type element 302, plot 1704 is for the first second type element 304, plot 1706 if for the second second type element 306, and plot 1708 is for the second first type element 308. The differences in the azimuthal directivities 1702, 1704, 1706, 1708 of the antenna elements 302, 304, 306, 308 contributes along with the spatial separation of the elements 302, 304, 306, 308 to increasing the isolation between antenna elements and obtaining a full rank channel matrix.

Figure 18:
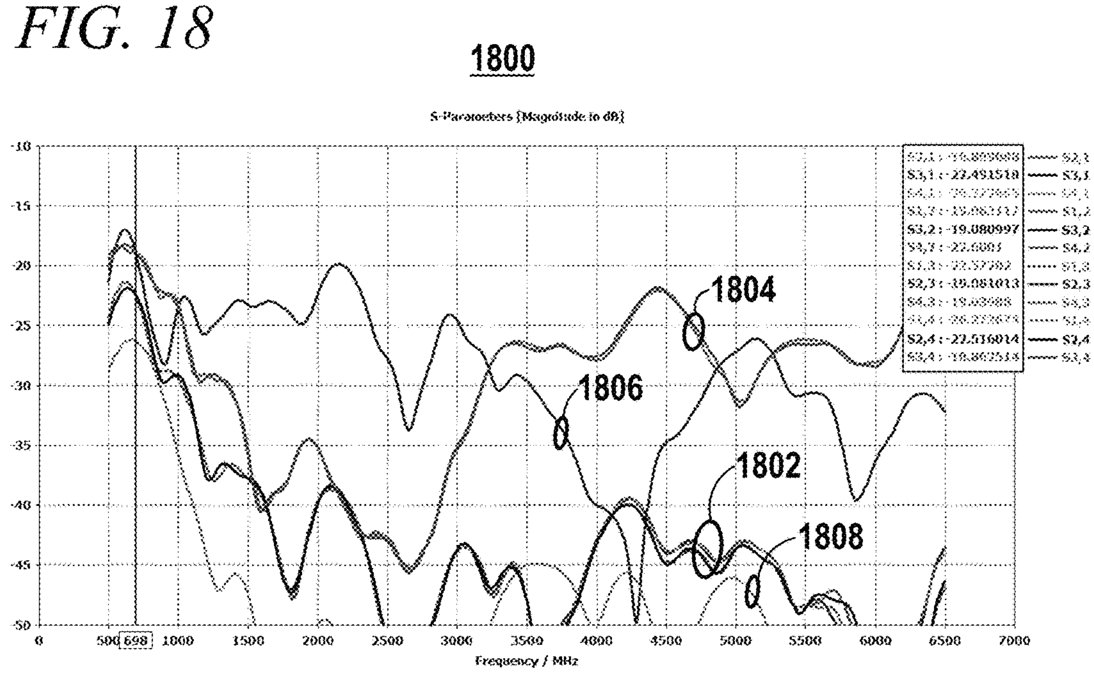
FIG. 18 is a graph including plots of S-parameters describing intercoupling between each combination of two elements of the MIMO antenna array shown in FIGS. 3-6.

In order to effectively preserve the number of independent channels, N (e.g., N=4) which can be obtained in a sufficiently conducive radio environment using a MIMO system with at least N transmitter antenna element and at least N receiver antenna elements, it is necessary that the antenna elements at the receiver MIMO array and at the transmitter MIMO array be sufficiently decoupled from each other. FIG. 18 is a graph including plots 1802, 1804, 1806, 1808 of S-parameters describing intercoupling between each combination of two elements 302, 304, 306, 308 of the MIMO antenna array shown in FIGS. 3-6 as a function of frequency. The abscissa indicates frequency in MHz and the ordinate indicates intercoupling in decibels. The S parameters may be denoted $S_{NM}$ where the subscripts N, M each denote one of the elements 302, 304, 306, 308. Subscript value 1 refers to element 302, subscript value 2 refers to element 304, subscript value 3 refers to element 306 and subscript value 4 refers to element 308. A first group of plots 1802 is for $S_{13}$, $S_{31}$, $S_{24}$, $S_{42}$ which are approximately equal due to symmetry. S parameters that are related by transposition of indices are in principle equal but deviation may occur due to measurement error. Due to the symmetry of the array 108 $S_{13}$ is in principal equal to $S_{42}$ however deviation may occur due to real world manufacturing tolerances. A second group of plots 1804 is for $S_{12}$, $S_{21}$, $S_{34}$ and $S_{43}$. Note that the intercoupling 1804 is generally higher than 1802 which may be attributed to the proximity of the elements involved. Another plot 1806 represents $S_{23}$ and $S_{32}$. Yet another plot 1808 represents $S_{14}$ and $S_{41}$. Note that all of the S parameters representing intercoupling are below 18 dB from 698 MHz to 6500 MHz which is a frequency band sufficient to cover many wireless communication protocols including many cellular communication protocols and many Wi-Fi communication protocols. The low intercoupling is believed to be due in part to the azimuthal nonuniformity of directivity patterns of the elements 302, 304, 306, 308 and due to the placement of the ground shunt conductors 712, 716, 1222, 1226 (which along with the shape of the elements 302, 304, 306, 308 also affects the directivity).

Figure 19:
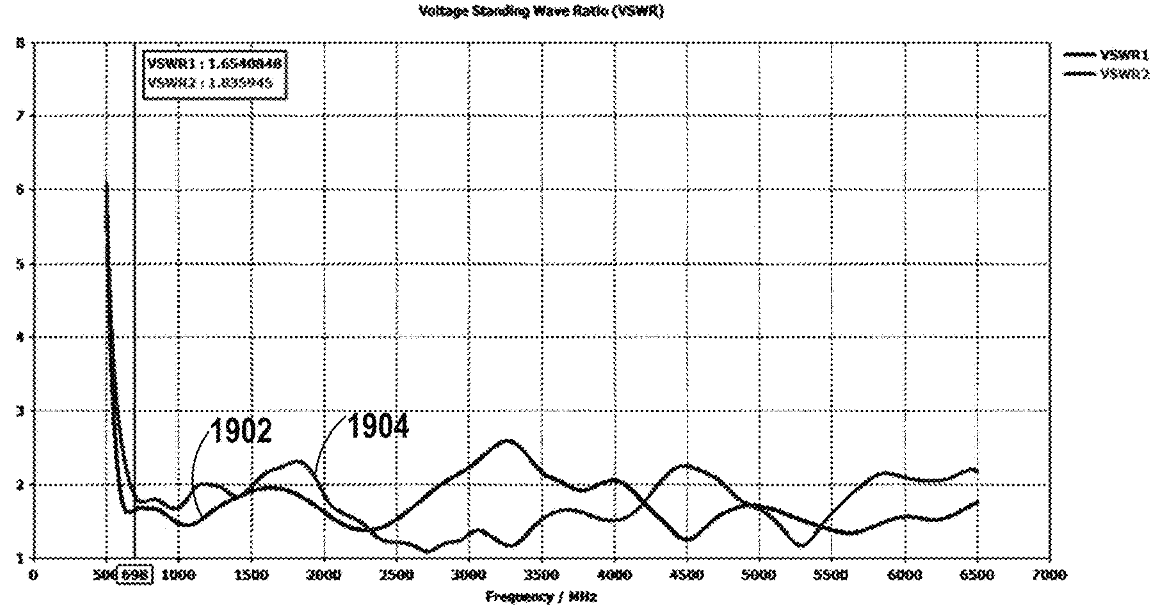
FIG. 19 is a graph including plots of the Voltage Standing Wave Ratio (VSWR) for the first type and second type antenna elements shown respectively in FIGS. 7-11 and 12-16 and used in the MIMO antenna array shown in FIGS. 3-6.

FIG. 19 is a graph 1900 including a first plot 1902 of the Voltage Standing Wave Ratio (VSWR) for the first type 302, 308 antenna elements and a second plot 1904 of the VSWR for the second type 304, 306 antenna elements. The abscissa of the graph 1900 indicates frequency in MHz and the ordinate indicates VSWR (unitless).

Figure 20:
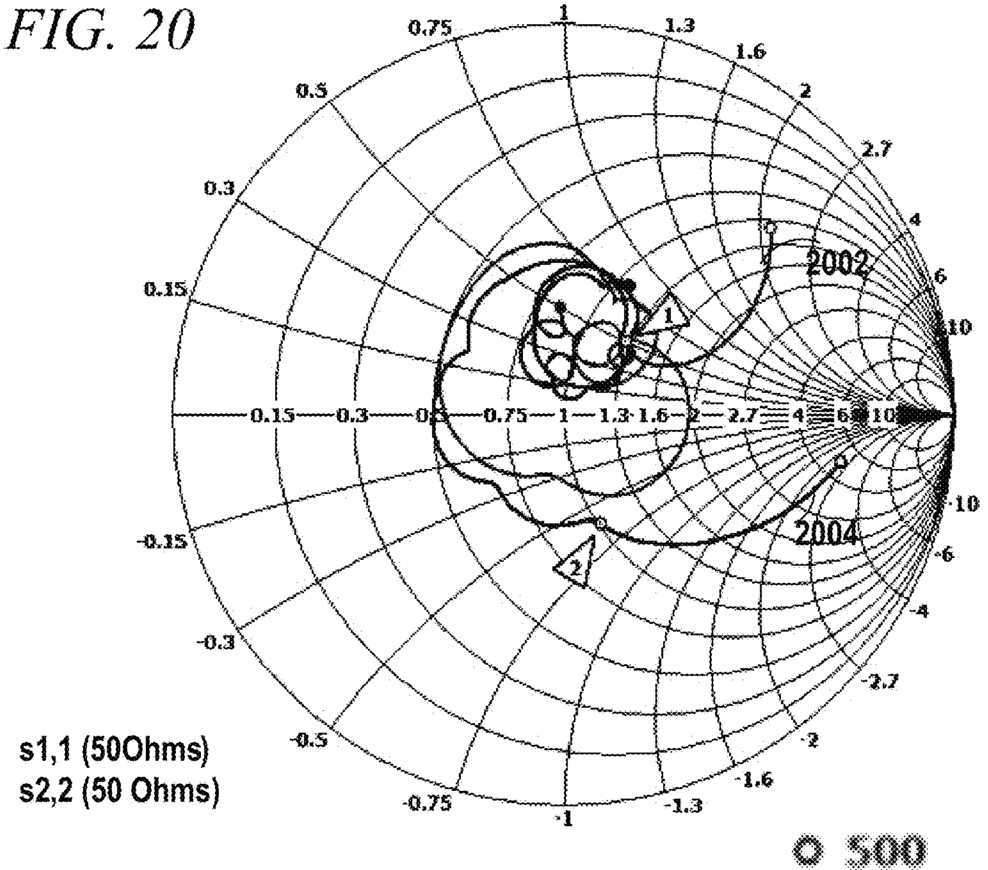
FIG. 20 is a Smith chart showing plots of the complex impedance for the first type and second type antenna elements shown respectively in FIGS. 7-11 and 12-16 and used in the MIMO antenna array shown in FIGS. 3-6.

FIG. 20 is a Smith chart 2000 including a first plot 2002 of the complex impedance for the first type of antenna element 302, 308 and a second plot 2004 of the complex impedance for the second type of antenna element 304, 306. The unfilled circle frequency markers at the outer ends of the plots 2002, 2004 correspond to 500 MHz and filled circle frequency markers at the inner end of the plots 2002, 2004 correspond to 6499 MHz. The frequency markers labeled with triangles inscribed with numerals 1 and 2 correspond to 698 Mhz. The impedance at the center of the Smith chart corresponds to 50 Ohms.

Figure 21:
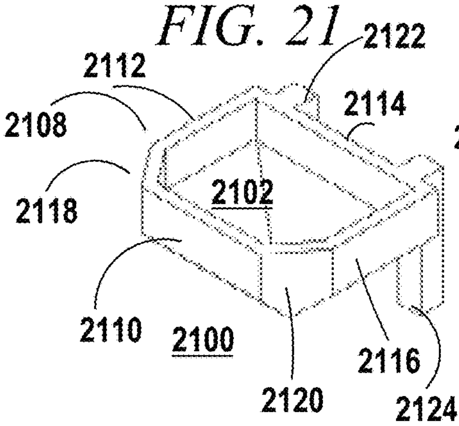
FIG. 21 is an isometric view of a polyhedral antenna element that can be used in MIMO antenna arrays disclosed herein according to a another embodiment of the invention.
Figure 22:
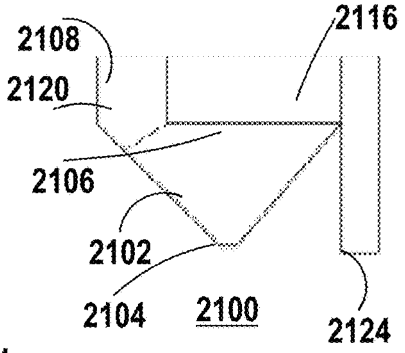
FIG. 22 is a side view of the polyhedral antenna element shown in FIG. 21.
Figure 23:
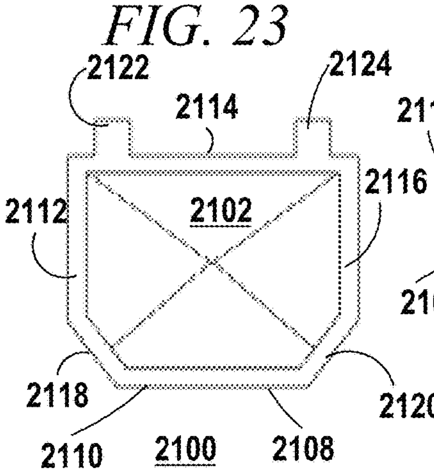
FIG. 23 is a top view of the polyhedral antenna element shown in FIG. 21.
Figure 24:
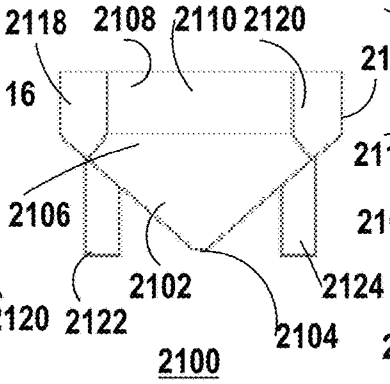
FIG. 24 is a front view of the polyhedral antenna element shown in FIG. 21.
Figure 25:
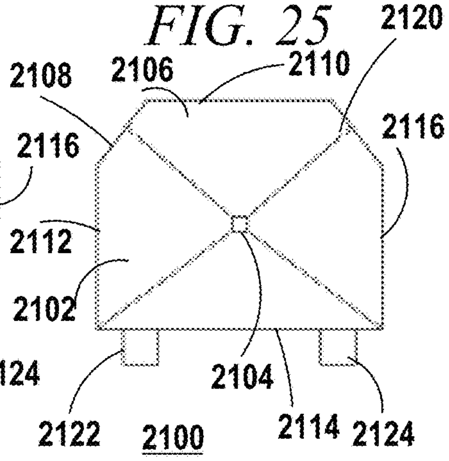
FIG. 25 is a bottom view of the polyhedral antenna element shown in FIG. 21.

FIGS. 21-25 show different views of a polyhedral antenna element 2100 that can be used in MIMO antenna arrays disclosed herein according to another embodiment of the invention. FIG. 21 is an isometric view; FIG. 22 is a side view; FIG. 23 is a top view; FIG. 24 is a front view and FIG. 24 is a bottom view. The polyhedral antenna element 2100 is distinguished from the antenna elements 302, 304, 306, 308 in that the polyhedral antenna element 2100 has a pyramidal tapered portion 2102 as opposed to conical tapered portions 702, 1202. The pyramidal tapered portion 2102 is four-sided however alternatively a different number of sides such as 3, 5 or a higher number are provided. The pyramidal tapered portion 2102 has a small end 2104 which serves as a feed end. In use one terminal (e.g., inner conductor 5610, FIG. 56) of a feed cable 5602 (FIG. 56) is coupled to the small end 2104 and a second terminal (e.g., outer conductor) of the feed cable is couple to a ground plane (such as 314, not shown in FIGS. 21-25) over which the antenna element 2200 is placed. The pyramidal tapered portion 2102 further includes a large end 2106. A polygonal vertical wall 2108 extends from the large end 2106 of the pyramidal tapered portion 2102. The polygonal vertical wall 2108 includes a front side 2110, a left side 2112, a back side 2114 and a right side 2116. A first small chamfer wall section 2118 connects the front side 2110 and the left side 2112. A second small chamfer wall section 2120 connects the front side 2110 and the right side 2116. A first ground shunt conductor 2122 extends from near a left end of the back side 2114 of the polygonal vertical wall 2108 down to the ground plane 314 (not shown in FIGS. 21-25). A second ground shunt conductor 2124 extends from near a right end of the back side 2114 of the polygonal vertical wall 2108 down to the ground plane 314. As in the case of the first type antenna elements 302, 308 the ground shunt conductors 2122, 2124 serve to reduce the directivity in the direction that the back side 2114 faces. By orienting the antenna element 2100 within an antenna array (not shown in FIGS. 21-25) such that the back side 2114 of the antenna element 2100 faces towards other elements intercoupling between antenna elements of the array is reduced and improved MIMO performance can be achieved.

Figure 26:
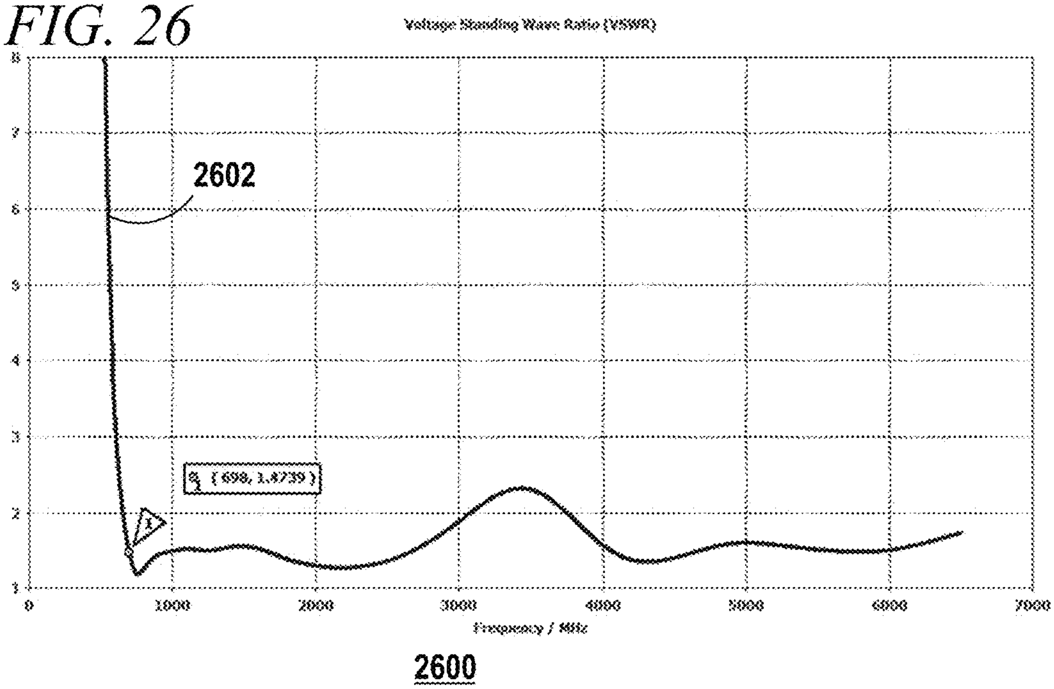
FIG. 26 is a graph including a plot of the Voltage Standing Wave Ratio (VSWR) for the antenna element shown in FIGS. 21-25.

FIG. 26 is a graph 2600 including a plot 2602 of the Voltage Standing Wave Ratio (VSWR) for the polyhedral antenna element 2100 shown in FIGS. 21-25. The abscissa of the graph 2600 indicates frequency in MHz and the ordinate indicates VSWR which is unitless. As shown in FIG. 26 the polyhedral antenna element 2100 exhibits relatively good VSWR between 698 MHz and 6500 MHz.

Figure 27:
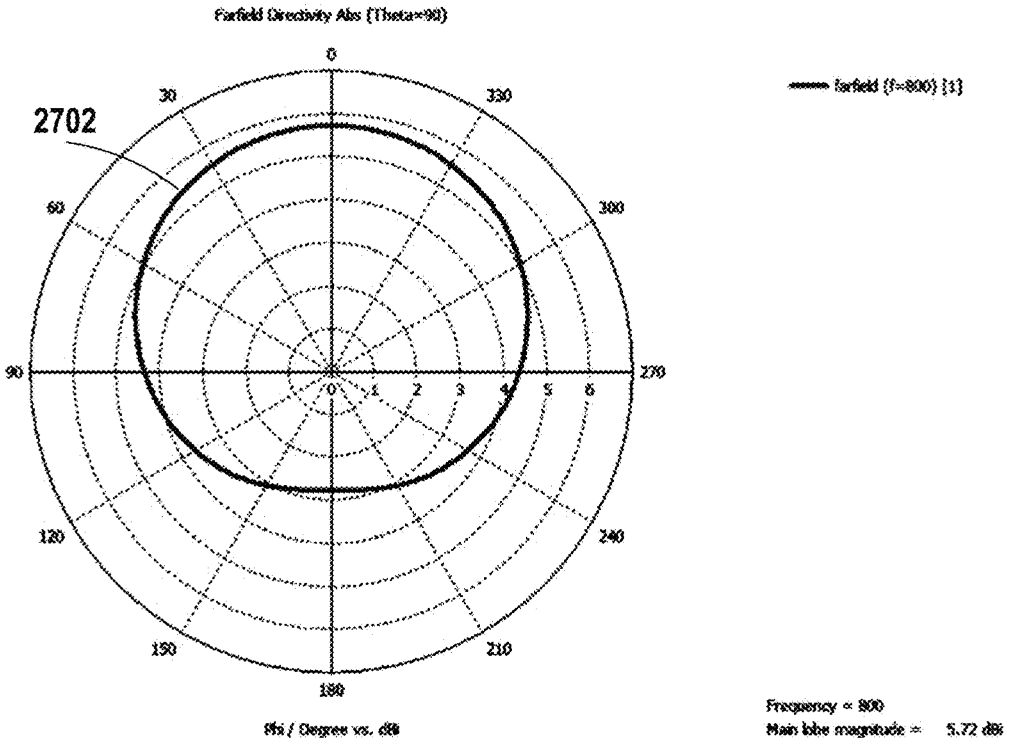
FIG. 27 is graph including an azimuthal directivity polar plot for the antenna element shown in FIGS. 21-25.

FIG. 27 is graph 2700 including an azimuthal directivity polar plot 2702 for the polyhedral antenna element 2100 shown in FIGS. 21-25. Azimuth angles in degrees is marked on the periphery of the graph. 180° on the graph 2700 corresponds the back side 2114 outward facing normal vector direction. The radial coordinate of the graph 2700 corresponds to directivity in dBi. The directivity plot 2702 exhibits a strong front-to-back asymmetry which is due in large measure to location of the ground shunt conductors 2122, 2124.

Figure 28:
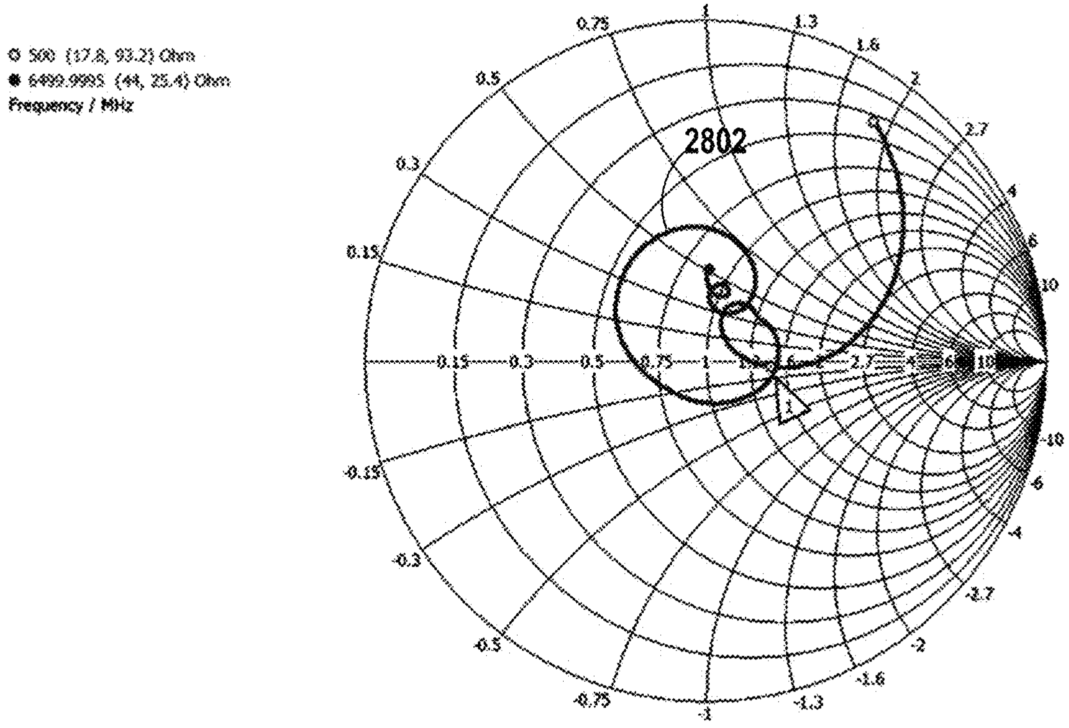
FIG. 28 is a Smith chart showing a plot of the complex impedance for the antenna element shown in FIGS. 21-25.

FIG. 28 is a Smith chart 2800 showing a plot of the complex impedance 2802 for the antenna element shown in FIGS. 21-25. The outer end of the plot 2802 marked by an open circle corresponds to a frequency of 500 Mhz and the inner end of the plot 2802 marked by a filled circle corresponds to a frequency of 6499 MHz. The frequency marker identified by the triangle inscribed with number 1 corresponds to a frequency of 698 Mhz. As shown the complex impedance plot 2802 curls around relatively close to the center of the plot which corresponds to a real impedance of 50 Ohms indicating a relatively good impedance match over a very broad frequency range of 698 to 6499 MHz.

Figure 29:
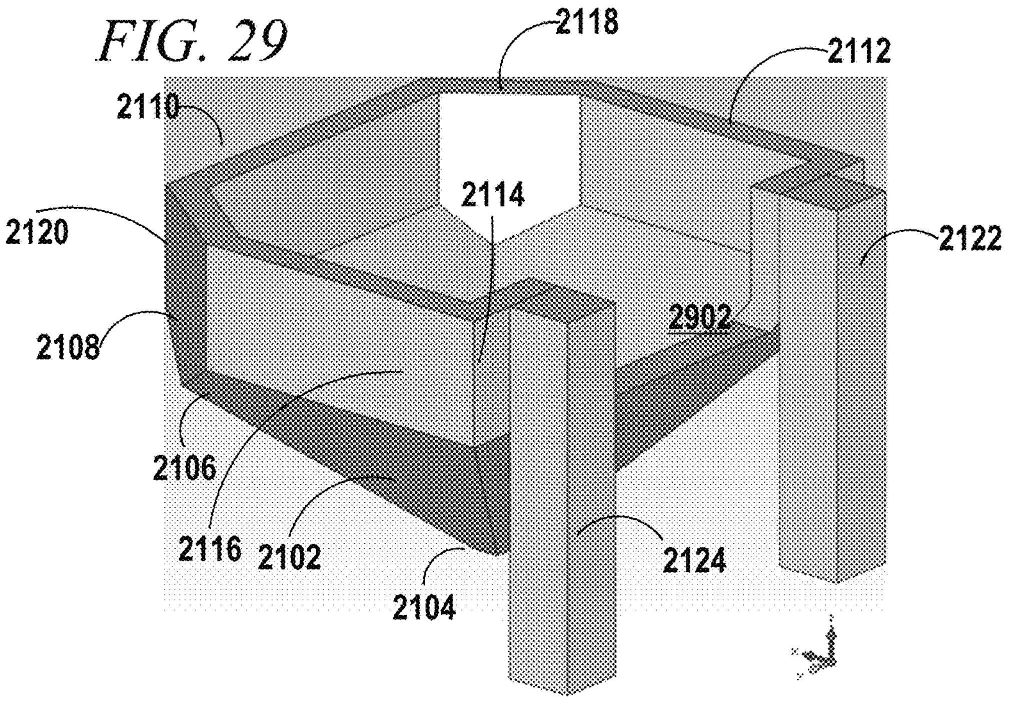
FIG. 29 is an isometric view of a polyhedral antenna element that can be used in MIMO antenna arrays disclosed herein according to yet another embodiment of the invention.
Figure 30:
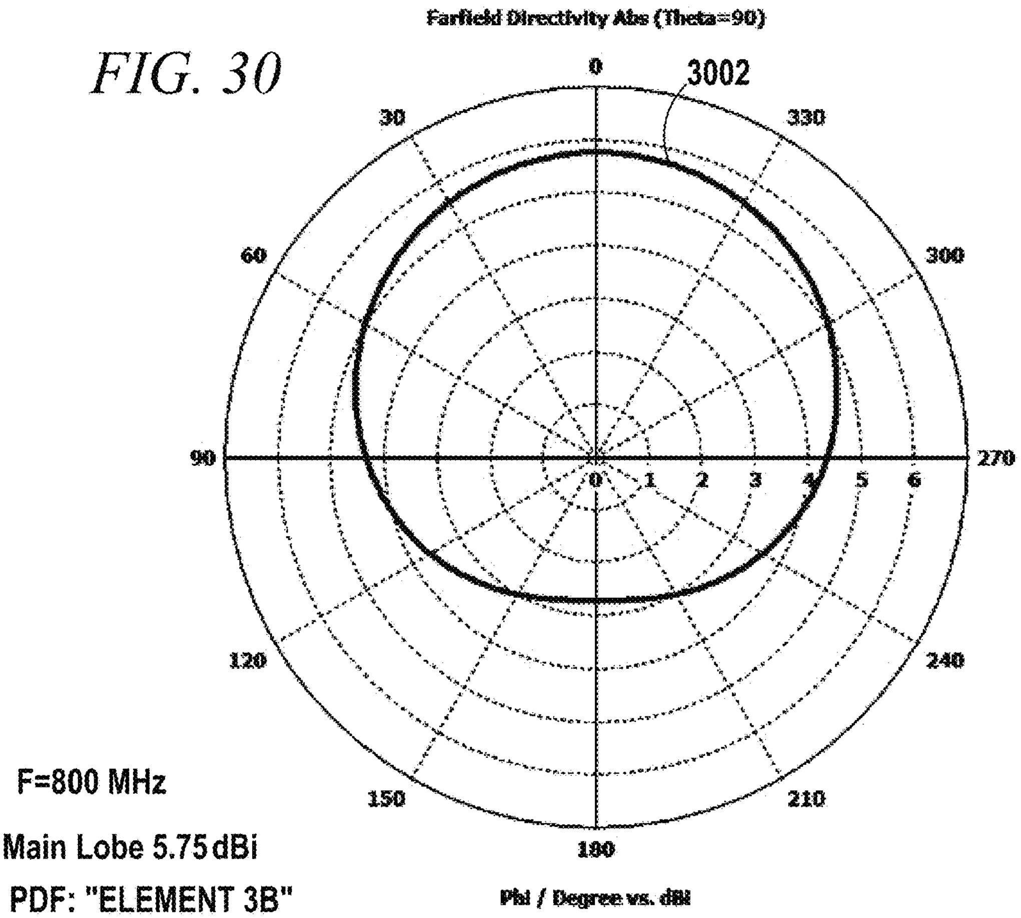
FIG. 30 is graph including an azimuthal directivity polar plot for the antenna element shown in FIG. 29.

FIG. 29 is an isometric view of a polyhedral antenna element 2900 that can be used in MIMO antenna arrays disclosed herein according to yet another embodiment of the invention. The polyhedral antenna element 2900 differs from the polyhedral antenna element 2100 shown in FIGS. 21-25 in that in the case of the polyhedral antenna element 2900 the back side 2114 of the polygonal vertical wall 2108 includes a cut out portion 2902 between ground shunt conductors 2122, 2124. FIG. 30 is graph 3000 including an azimuthal directivity polar plot 3002 for the antenna element 2900 shown in FIG. 29. The provision of the cut out portion 2902 serves to slightly reduce the directivity in the vicinity of 180° and slightly increase the directivity at 0°.

Figure 31:
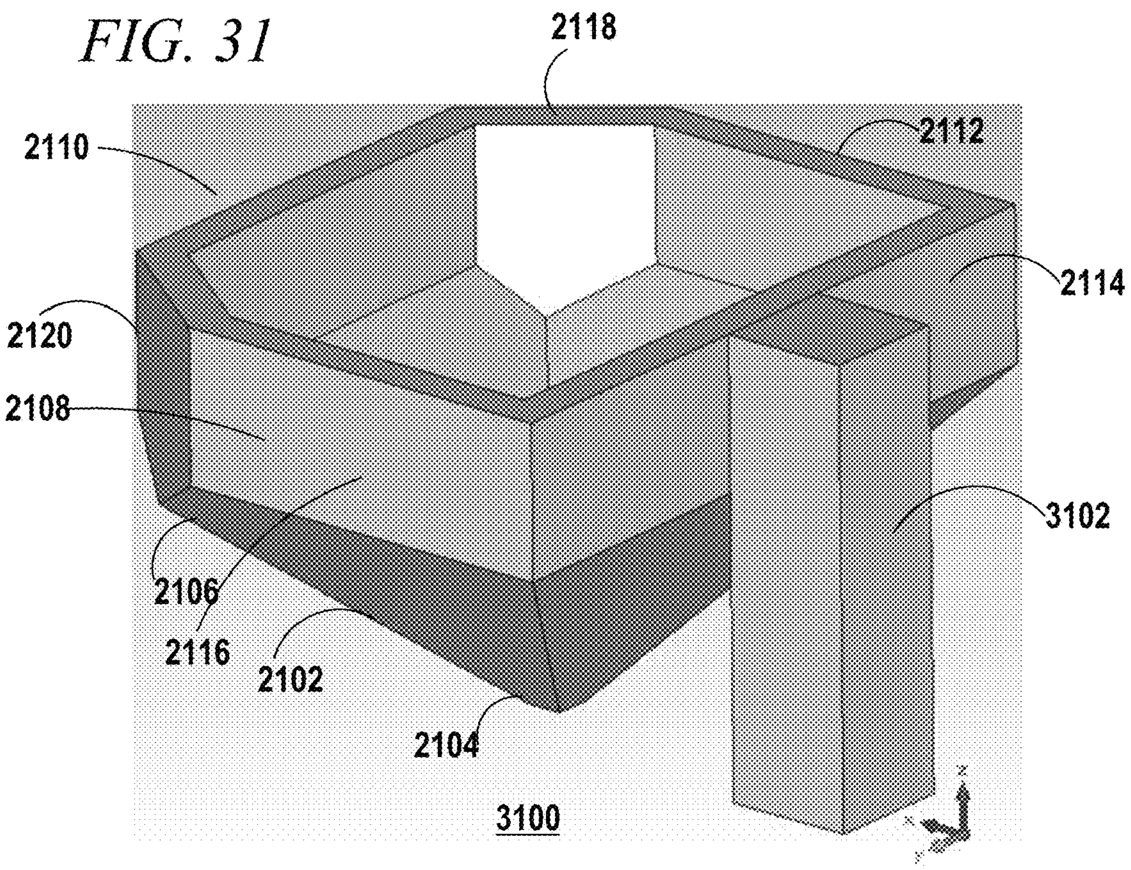
FIG. 31 is an isometric view of a polyhedral antenna element that can be used in MIMO antenna arrays disclosed herein according to a further embodiment of the invention.

FIG. 31 is an isometric view of a polyhedral antenna element 3100 that can be used in MIMO antenna arrays disclosed herein according to a further embodiment of the invention. The polyhedral antenna element 3100 differs from the polyhedral antenna element 2100 shown in FIGS. 21-25 in that rather than having two ground shunt conductors 2122, 2124, the polyhedral antenna element 3100 includes a single ground shunt conductor 3102 that extends from the center of the back side 2114 of the polygonal vertical wall 2108.

Figure 32:
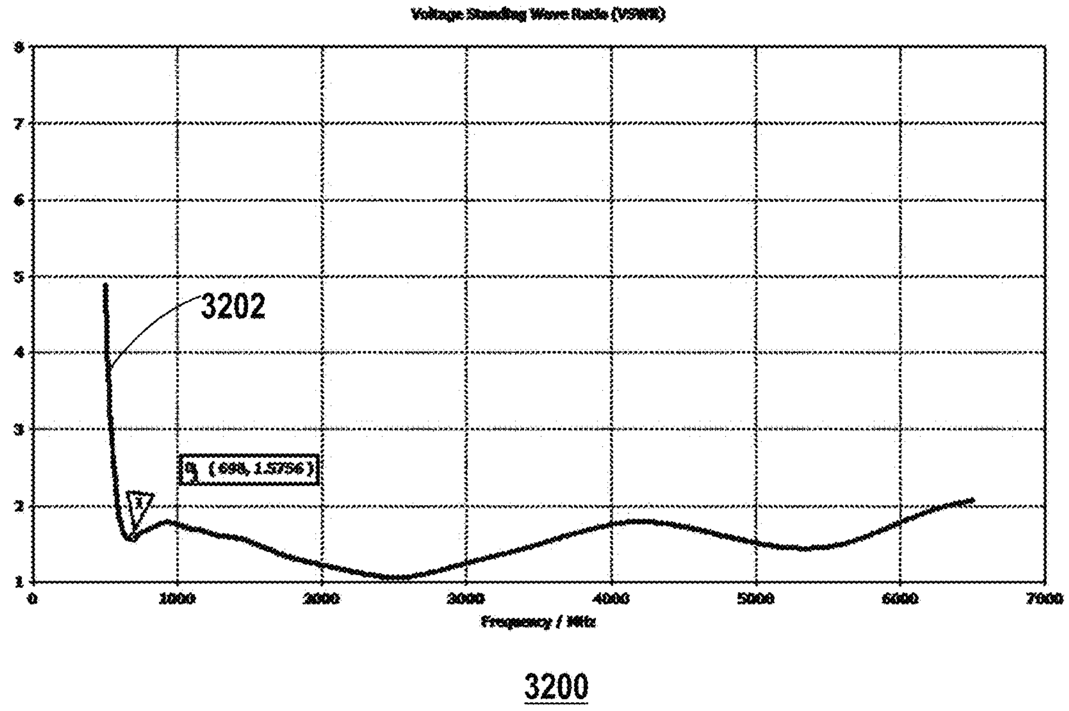
FIG. 32 is a graph including a plot of the Voltage Standing Wave Ratio (VSWR) for the antenna element shown in FIG. 31.

FIG. 32 is a graph 3200 including a plot 3202 of the Voltage Standing Wave Ratio (VSWR) for the antenna element 3100 shown in FIG. 31. The abscissa of the graph 3200 indicates frequency in MHz and the ordinate indicates VSWR which is unitless. As shown in FIG. 32 the polyhedral antenna element 3100 exhibits relatively good VSWR between 698 MHz and 6500 MHz.

Figure 33:
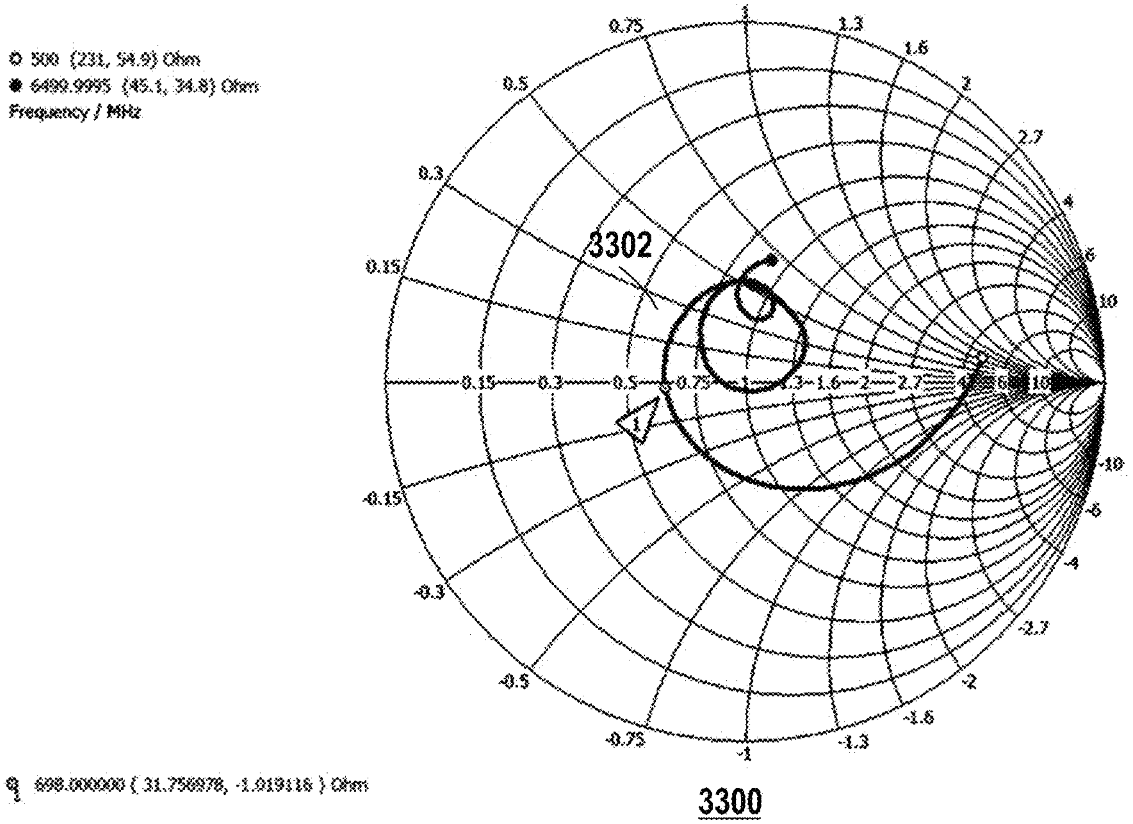
FIG. 33 is a Smith chart showing a plot of the complex impedance for the antenna element shown in FIG. 31.

FIG. 33 is a Smith chart 3300 showing a plot 3302 of the complex impedance for the antenna element 3100 shown in FIG. 31. The outer end of the plot 3302 marked by an open circle corresponds to a frequency of 500 Mhz and the inner end of the plot 3302 marked by a filled circle corresponds to a frequency of 6499 MHz. The frequency marker identified by the triangle inscribed with number 1 corresponds to a frequency of 698 Mhz. As shown in the frequency range of 698-6499 MHz the complex impedance plot curls 3302 around relatively close to the center of the plot which corresponds to a real impedance of 50 Ohms indicating a relatively good impedance match.

Figure 34:
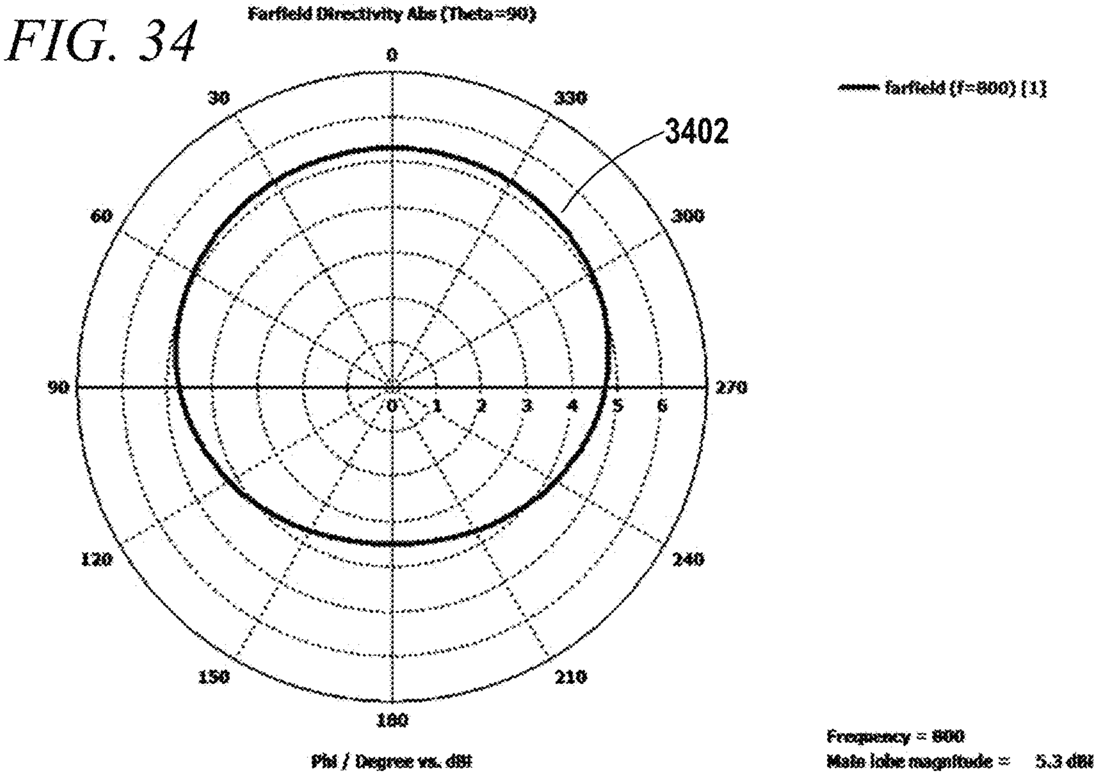
FIG. 34 is graph including an azimuthal directivity polar plot for the antenna element shown in FIG. 31.

FIG. 34 is graph 3400 including an azimuthal directivity plot 3402 for the antenna element 3100 shown in FIG. 31. The azimuth angle in degrees is marked on the periphery of the graph 3400. 180° on the graph 3400 corresponds to the back side 2114 outward facing normal vector direction. The radial coordinate corresponds to directivity in dBi. The directivity plot 3402 exhibits a front-to-back asymmetry however because the antenna element 3100 has only a single ground shunt conductor 3102 (compared to the antenna element 2100 which has two ground shunt conductors 2122, 2124) the front-to-back directivity difference is not so pronounced in the case of the antenna element 3100 shown in FIG. 31.

Figure 37:
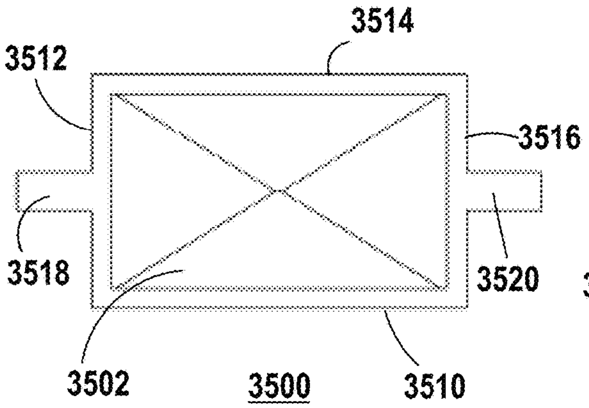
FIG. 37 is a top view of the polyhedral antenna element shown in FIG. 35.
Figure 35:
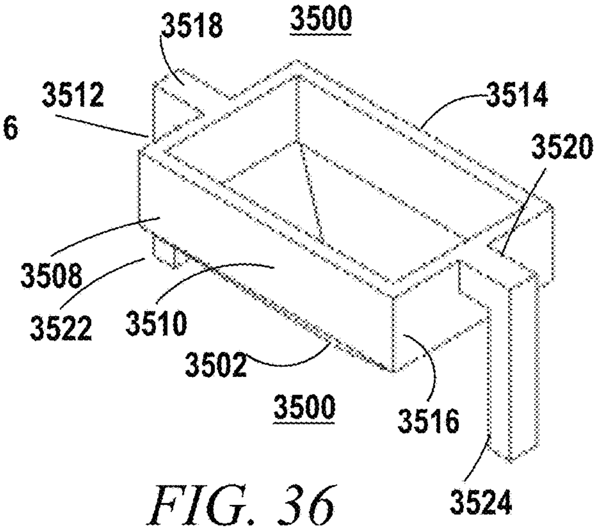
FIG. 35 is an isometric view of a polyhedral antenna element that can be used in MIMO antenna arrays disclosed herein according to a still further embodiment of the invention.
Figure 38:
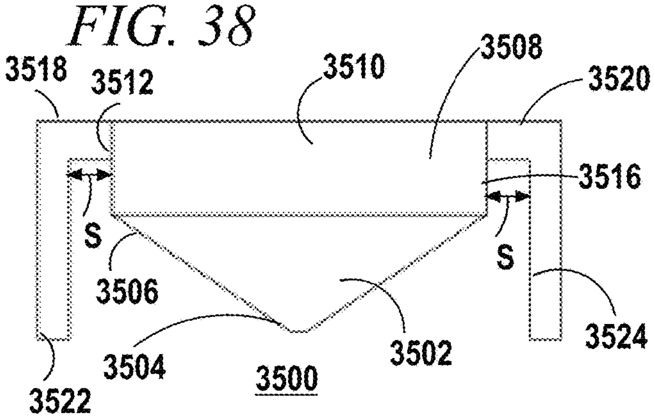
FIG. 38 is a front view of the polyhedral antenna element shown in FIG. 35.
Figure 36:
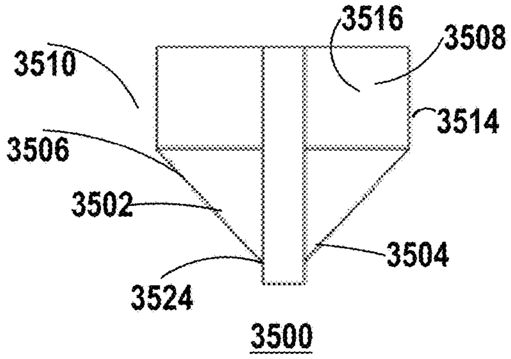
FIG. 36 is a side view of the polyhedral antenna element shown in FIG. 35.
Figure 39:
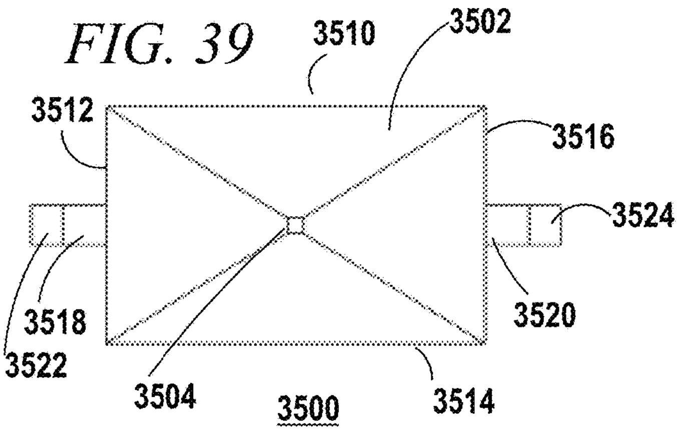
FIG. 39 is a bottom view of the polyhedral antenna element shown in FIG. 35.

FIGS. 35-39 show different views of a polyhedral antenna element 3500 that can be used in MIMO antenna arrays disclosed herein according to another embodiment of the invention. FIG. 35 is an isometric view; FIG. 36 is a side view; FIG. 37 is a top view; FIG. 38 is a front view and FIG. 39 is a bottom view. The overall shape of the polyhedral antenna element 3500 is similar to the shape of the second type antenna element 304, 306. The polyhedral antenna element 3500 is distinguished from the second type antenna element 304, 306 in that the polyhedral antenna element 3500 has a pyramidal tapered portion 3502 as opposed to the conical tapered portions 1202. The pyramidal tapered portion 3502 is four-sided however alternatively a different number of sides such as 3, 5 or a higher number are provided. The pyramidal tapered portion 3502 has a small end 3504 which serves as a feed end. In use one terminal (e.g., inner conductor 5610, FIG. 56) of a feed cable (e.g. 5602, FIG. 56) is coupled to the small end 3504 and a second terminal (e.g., outer conductor 5608, FIG. 56) of the feed cable is coupled to a ground plane (such as 314, not shown in FIGS. 21-25) over which the antenna element 3500 is placed. The pyramidal tapered portion 3502 further includes a large end 3506. A rectangular vertical wall 3508 extends from the large end 3506 of the pyramidal tapered portion 3502. The vertical extend of the rectangular vertical wall 3508 helps to increase an effective electrical length thereby aiding antenna performance at low frequencies (e.g., in the vicinity of 700 MHz, (See FIGS. 40, 42). The rectangular vertical wall 3508 includes a front side 3510, a left side 3512, a back side 3514 and a right side 3516. A first horizontal bridge portion 3518 extends outward from the top-center of the left side 3512 of the rectangular vertical wall 3508 and similarly a second horizontal bridge portion 3520 extends outward from the top-center of the right side 3516. A first ground shunt conductor 3522 extends from an outer end of the first horizontal bridge portion 3518 down to the ground plane 314 (not shown in FIGS. 21-25). A second ground shunt conductor 3524 extends from an outer end of the second horizontal bridge portion 3520 down to the ground plane 314. As in the case of the second type antenna elements 304, 306 the ground shunt conductors 3522, 3524 serve to reduce the directivity in the directions of outward normal to the left side 3512 and right side 3516 face. The first ground shunt conductor 3522 and the second ground shunt conductor 3524 are spaced from, respectively, from the left side 3512 and the right side 3516 of the rectangular vertical wall 3508 by a distance S which in the embodiment shown in FIGS. 35-39 is 11 millimeters. More generally according to certain embodiments of the present invention bridge conductors are provided to space ground shunt antenna elements away from tapered portions or extensions thereof (e.g., vertical walls) by at least 5 millimeters. Providing the horizontal bridge portions 3518, 3520 and spacing the ground shunt conductors 3522, 3524 away from the vertical wall 3508 helps to reduce the directivity toward the left and right sides of the antenna element 3500.

By orienting the antenna element 3500 within an antenna array (not shown in FIGS. 35-39) such that the left side 3512 and the right side 3516 of the antenna element 3500 face towards other elements, intercoupling between antenna elements of the array is reduced and improved MIMO performance can be achieved due to the presence of the ground shunt conductors 3522, 3524. Providing the ground shunt conductors 3522, 3524 and spacing the ground shunt conductors 3522, 3524 away from the away from the vertical wall 3508 (as indicated above) helps in reducing intercoupling between elements when the antenna element is used in a MIMO array, and helps to improve angular diversity which also tends to improve MIMO performance.

Figure 40:
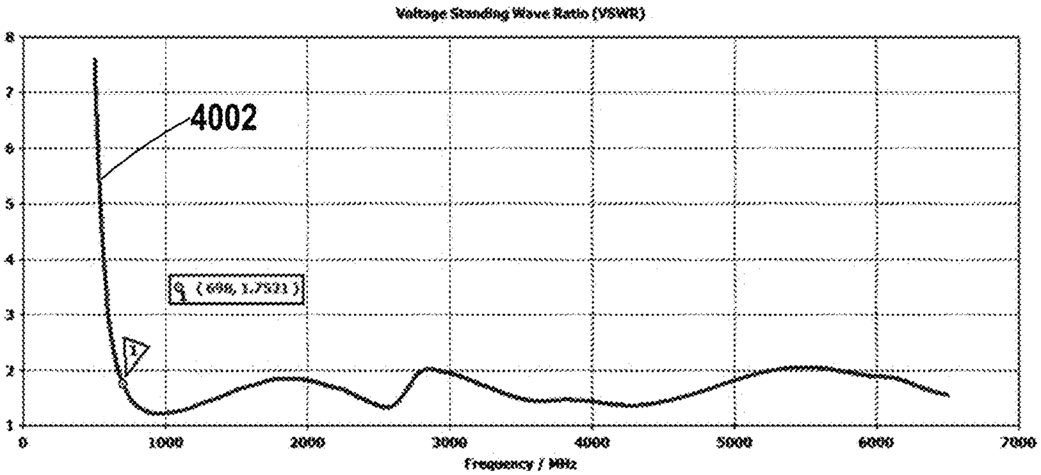
FIG. 40 is a graph including plots of the Voltage Standing Wave Ratio (VSWR) for the polyhedral antenna element shown in FIG. 35.

FIG. 40 is a graph 4000 including a plot 4002 of the Voltage Standing Wave Ratio (VSWR) for the polyhedral antenna element 3500 shown in FIG. 35. The abscissa of the graph 4000 indicates frequency in MHz and the ordinate indicates VSWR which is unitless. As shown the polyhedral antenna element 3500 exhibits relatively good VSWR between 698 MHz and 6500 MHz.

According to one working embodiment the width (horizontal dimension in FIGS. 37-39) of the antenna element 3500 excluding the horizontal bridge portions 3518, 3520 and the ground shunt conductors 3522, 3524 is 96 millimeters and the depth (vertical dimension in FIGS. 37, 39) is 60 millimeters and the height (vertical dimension in FIG. 38) is 56 millimeters and the length of the horizontal bridge portions 3518, 3520 (measured horizontally in FIG. 37) is 19 millimeters. Thus the ratio of the width to depth is about 1.6. More generally, according to certain embodiments the ratio of width to depth is greater than 1.5. The non-unity ratio of width-to-depth is a contributing factor (along with the placement of the ground shunt conductors 3522, 3524) in controlling the azimuthal directivity variation produced by the antenna element 3500 so as to create angular ranges of reduced directivity around the width direction as shown in FIG. 41 discussed below.

Figure 41:
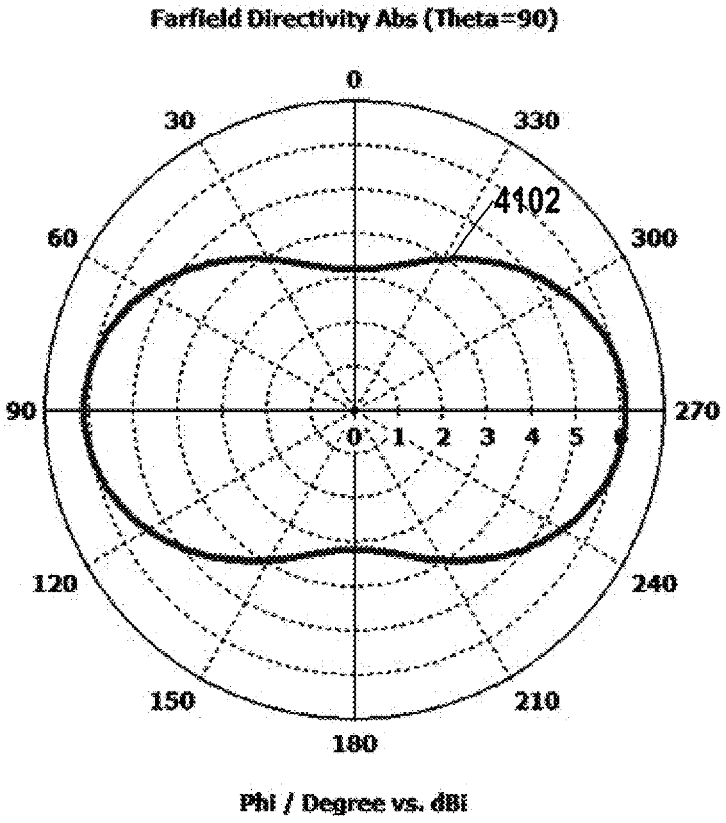
FIG. 41 is graph including an azimuthal directivity polar plot for the antenna element shown in FIG. 35.

FIG. 41 is graph 4100 including an azimuthal directivity plot 4102 for the antenna element 3500 shown in FIG. 35. Azimuth angles in degrees is marked on the periphery of the graph 4100. 0° on the graph 4100 corresponds to the left side 3512 outward facing normal vector direction and 180° on the graph 4100 corresponds the right side 3516 outward facing normal vector direction. The radial coordinate corresponds to directivity in dBi. The directivity is higher in the front and back directions (90° and 270°) and weaker in the left and right directions (0° and 180°).

Figure 42:
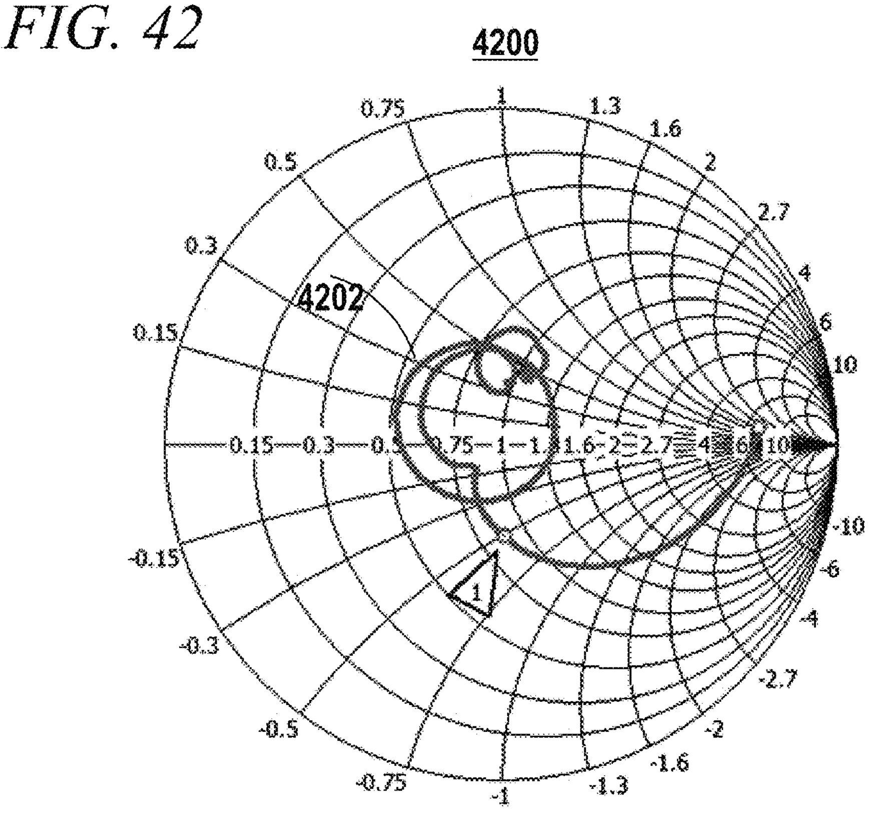
FIG. 42 is a Smith chart showing a plot of the complex impedance for the antenna element shown in FIG. 35.

FIG. 42 is a Smith chart 4200 showing a plot 4202 of the complex impedance for the antenna element 3500 shown in FIG. 35. The outer end of the plot 4202 marked by an open circle corresponds to a frequency of 500 MHz and the inner end of the plot 4202 marked by a filled circle corresponds to a frequency of 6499 MHz. The frequency marker identified by the triangle inscribed with number 1 corresponds to a frequency of 698 Mhz. As shown the complex impedance plot curls around relatively close to the center of the plot which corresponds to a real impedance of 50 Ohms indicating a relatively good impedance match over a very broad frequency range of 698 to 6499 MHz.

Figure 43:
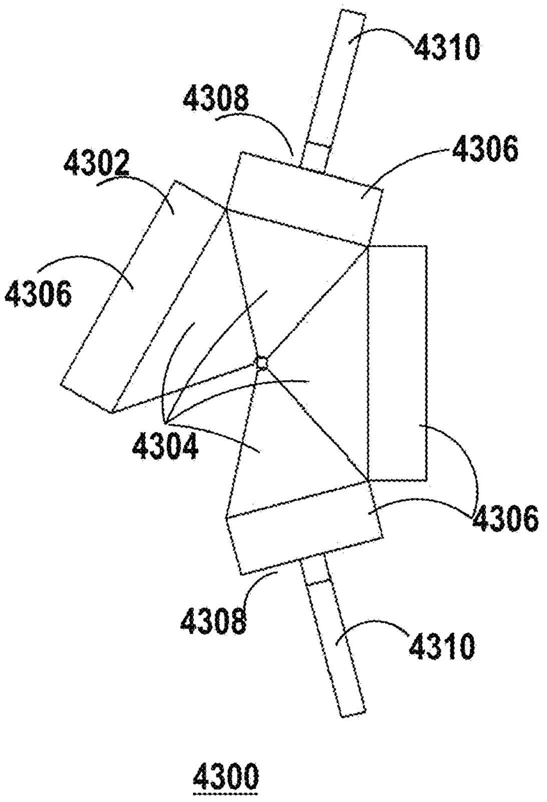
FIG. 43 shows a first layout of flat conductive material that can be formed into a polyhedral antenna element similar to that shown in FIGS. 35-39.

FIG. 43 shows a first layout 4300 of flat conductive material 4302 that can be formed into a polyhedral antenna element similar to the polyhedral antenna element 3500 (FIGS. 35-39). The flat conductive material 4302 is suitably sheet metal, such as copper or aluminum sheet metal. Alternatively the flat conductive material can take the form of flexible copper tape that is supported by a plastic object of the same shape as polyhedral antenna element 3500 (FIGS. 35-39). In FIG. 43 different portion of the material 4302 are demarcated by solid fold lines. Four triangular portions 4304 will form a pyramidal tapered portion. Four rectangular portions 4306 connected to the triangular portions 4304 will form a rectangular vertical wall. Two short segments 4308 extending from two opposite rectangular portions 4306 will form horizontal bridge portions and two longer segments 4310 extending from the two short segments 4308 will form ground shunt conductors.

Figure 44:
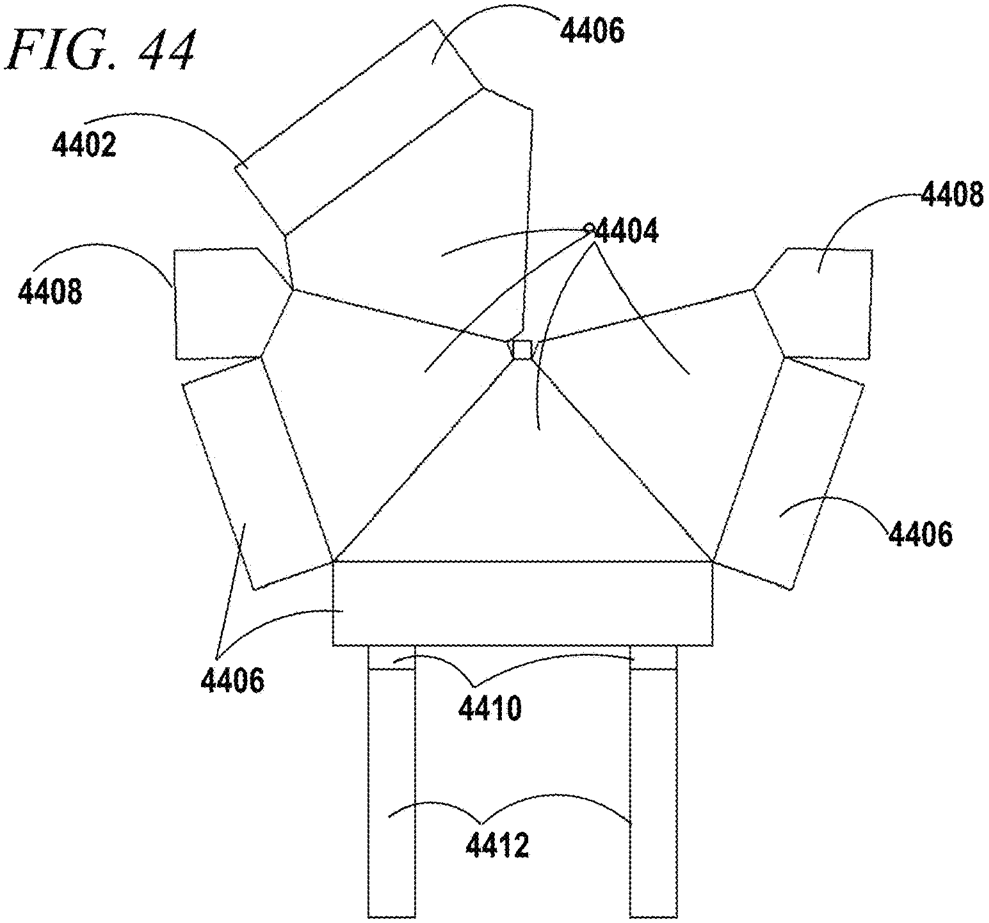
FIG. 44 shows a second layout of flat conductive material that can be formed into a polyhedral antenna element similar to that shown in FIGS. 21-25.

FIG. 44 shows a second layout 4400 of flat conductive material 4402 that can be formed into the polyhedral antenna 2100 element similar to that shown in FIGS. 21-25. The flat conductive material 4402 is suitably sheet metal, such as copper or aluminum sheet metal. Alternatively a flex that is adhered onto a supporting dielectric (e.g., plastic, ceramic) carrier may be used. In FIG. 44 different portion of the material 4402 are demarcated by solid fold lines. Four triangular portions 4404 will form a pyramidal tapered portion. Four rectangular portions 4406 and two irregular pentagonal portions 4408 that are connected to the triangular portions 4404 will form a polygonal vertical wall. Two short segments 4410 extending from one of the rectangular portions 4406 will form horizontal bridge portions and two longer segments 4412 extending from the two short segments 4308 will form ground shunt conductors.

Figure 45:
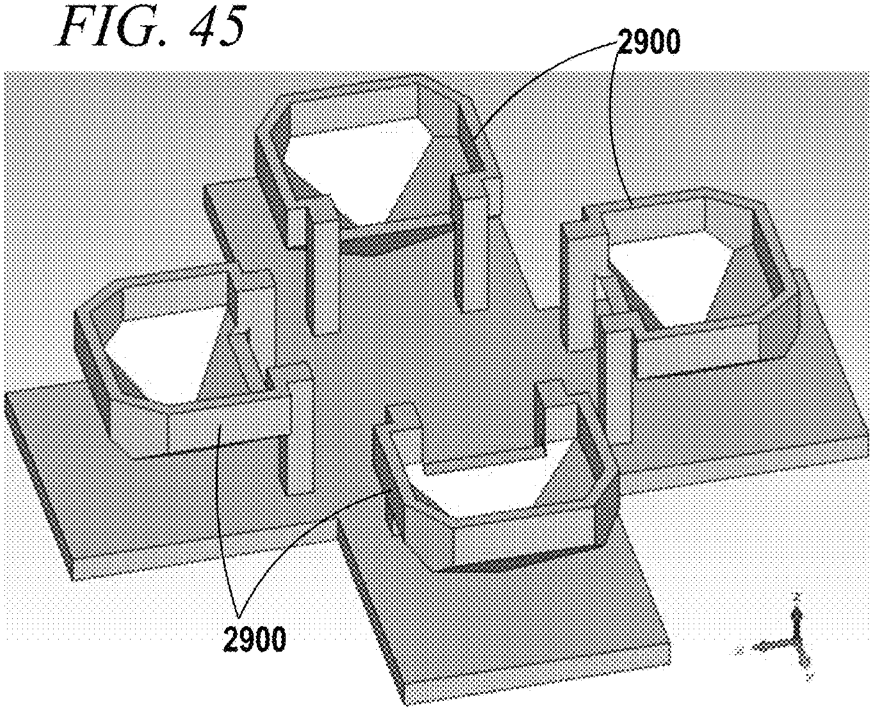
FIG. 45 is a perspective view of a wideband MIMO antenna array according to another embodiment of the invention.

FIG. 45 is a perspective view of a wideband MIMO antenna array 4500 according to another embodiment of the invention. The array 4500 includes four polyhedral antenna elements 2900 (FIG. 29) arranged in a cross pattern with the back sides 2114 of the polygonal vertical wall 2108 pointed inward toward the center of the cross pattern. As discussed above and shown in FIG. 30 the directivity in the direction of the back side 2114 of the elements 2900 is relatively reduced and therefore in the arrangement of the elements 2900 in the array 4500 intercoupling between elements is somewhat reduced leading to improved MIMO performance. In the array 4500 the peak of the directivity 3002 (FIG. 30) faces radially outward with respect to the center of the cross pattern in four different directions corresponding to the orientations of the four elements 2900. So with respect to the Cartesian axes marker shown in FIG. 45 the peaks directivity peaks for the four elements 2900 face in the +X, −X, +Y and −Y directions. It should be noted that placing the elements 2900 in the array 4500 will perturb the directivity pattern relative to what is shown in FIG. 30.

Figure 46:
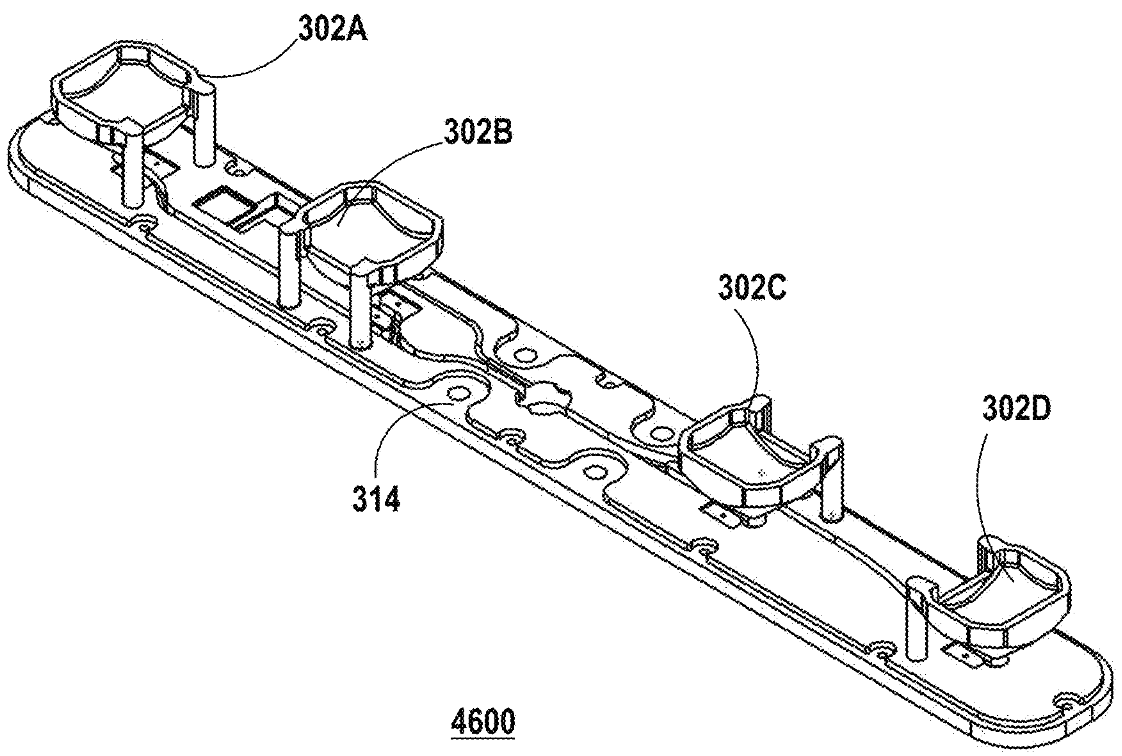
FIG. 46 is an isometric view of a wideband MIMO antenna array according to yet another embodiment of the invention.
Figure 47:
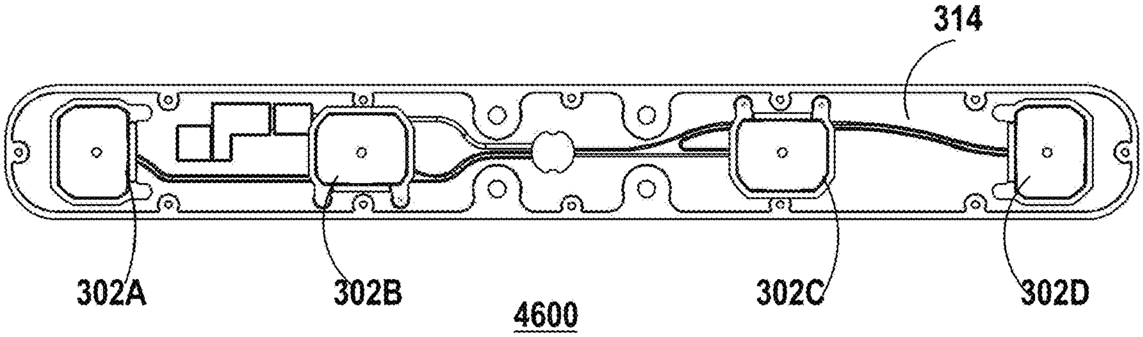
FIG. 47 is a top view of a wideband MIMO antenna array shown in FIG. 46.
Figure 48:
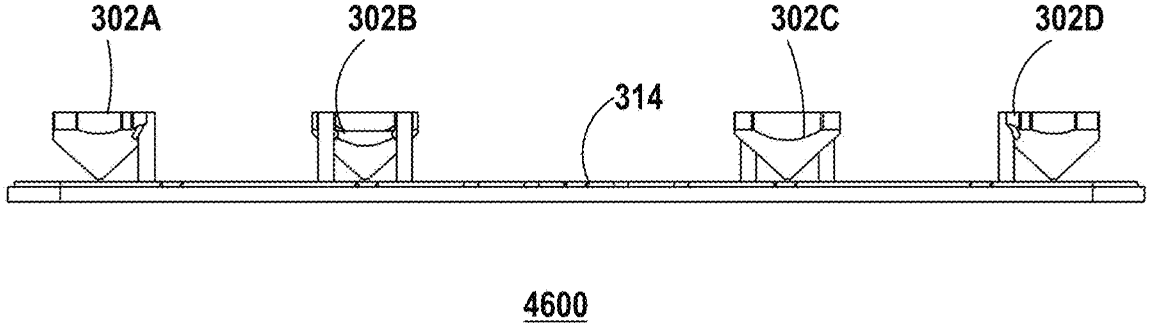
FIG. 48 is a front view of a wideband MIMO antenna array shown in FIG. 46.

FIGS. 46-48 show various views of a wideband MIMO antenna array 4600 according to yet another embodiment of the invention. FIG. 46 is an isometric view, FIG. 47 is a top view, and FIG. 48 is a front view of the antenna array 4600. The array 4600 is a linear array and includes four polyhedral antenna elements 302A, 302B, 302C, 302D of the type shown in FIGS. 7-11. Each of the four polyhedral antenna elements 302A, 302B, 302C, 302D is oriented in a different direction so that the maximum directivity of the elements 302A, 302B, 302C, 302D face in different directions. A first element 302A faces a first end 4602 of the array, a fourth element 302D faces a second end 4604 of the array and a second element 302B and a third element 302C are positioned between the first element 302D and the fourth element 302D. Thus the weakest range of the directivity patterns of the first element 302A and the fourth element 302D face the other elements of the array 4600. Additionally because the sides of the second element 302B and the third element 302C face the other elements of the array intermediate strength ranges of the directivity patterns of the second element 302B and the third element 302C faces the other elements of the array. Such arrangements help to control intercoupling between elements of the array 4600.

Figure 49:
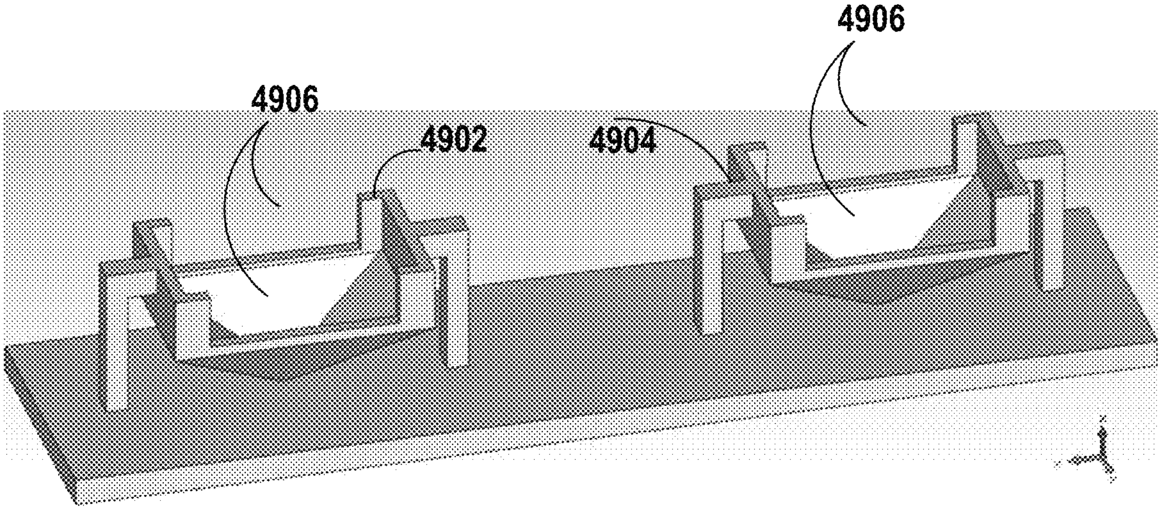
FIG. 49 is an isometric view of a wideband MIMO antenna array according to a further embodiment of the invention.

FIG. 49 is an isometric view of a wideband MIMO antenna array 4900 according to a further embodiment of the invention. The array includes a first polygonal antenna element 4902 and a second polygonal antenna element 4904 positioned side-by-side. The polygonal antenna elements 4902, 4904 are similar to the antenna element 3500 shown in FIGS. 35-39 and described above but differ in that the polygonal antenna elements 4902, 4904 include U-shaped notches 4906 as in the case of the second type antenna elements 304, 306 (FIGS. 3, 13-16).

Figure 50:
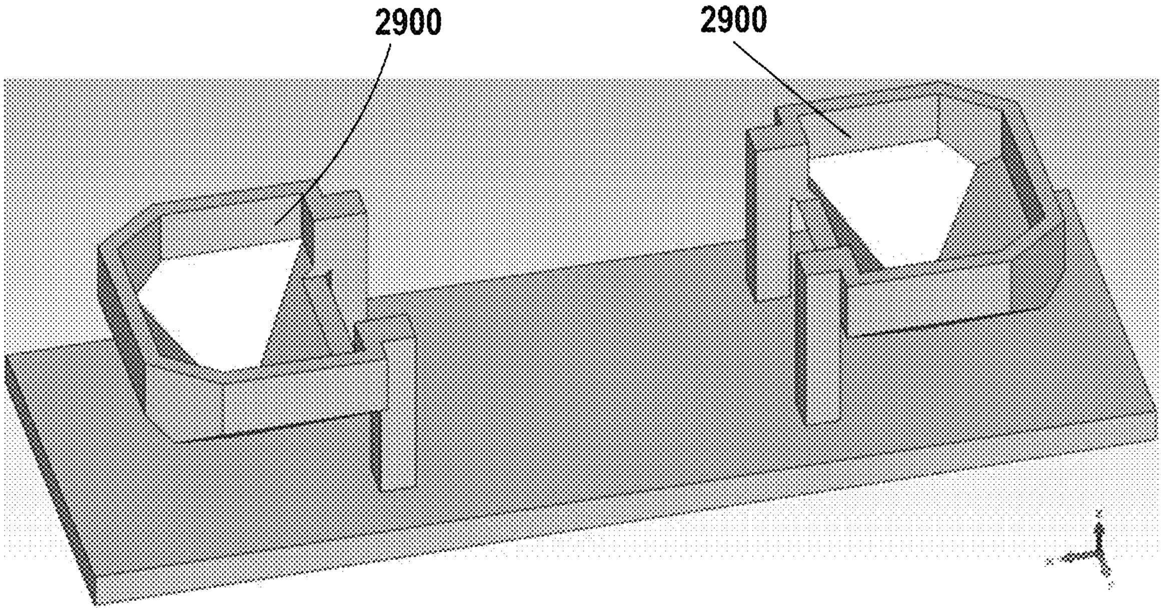
FIG. 50 is an isometric view of a wideband MIMO antenna array according to a still further embodiment of the invention.

FIG. 50 is an isometric view of a wideband MIMO antenna array 5000 according to a still further embodiment of the invention. The array 5000 includes two of the polygonal antenna elements 2900 (FIG. 29) facing back-to-back. In this arrangement relatively weak directivity angular ranges of each antenna 2900 element faces the other antenna element 2900 which reduces intercoupling and tends to increase MIMO bandwidth performance.

Figure 51:
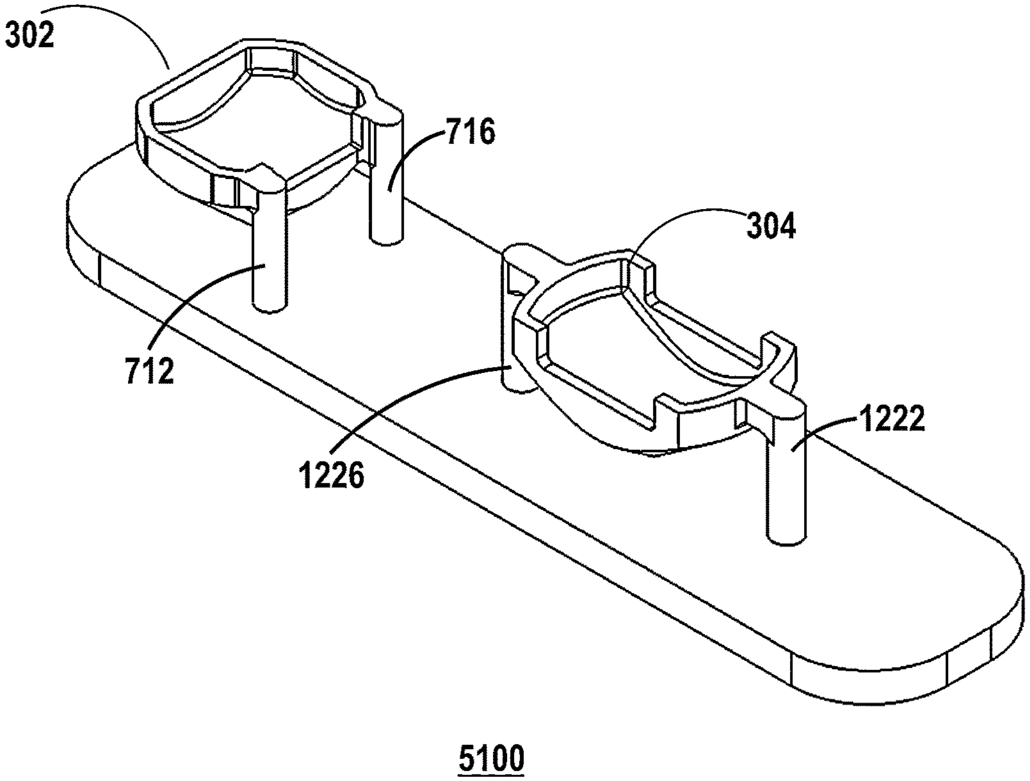
FIG. 51 is an isometric view of a wideband MIMO antenna array according to yet another embodiment of the invention.

FIG. 51 is an isometric view of a wideband MIMO antenna array 5100 according to yet another embodiment of the invention. The array 5100 includes one of the first type of antenna elements 302 (FIGS. 7-11) and one of the second type of antenna elements 304 (FIGS. 12-16). In the array 5100 the first type antenna element 302 is oriented so that the ground shunt conductors are located on a side of the element 302 facing toward the second type antenna element 304. Also in the array 5100 the second type antenna element is oriented so that the second ground shunt conductor 1226 is located on a side of the element 304 facing the first antenna element 302. In this manner each element 302, 304 has a relatively low directivity angular range facing toward the other element 302, 304 and cross coupling is reduced and MIMO performance tends to increase.

Figure 52:
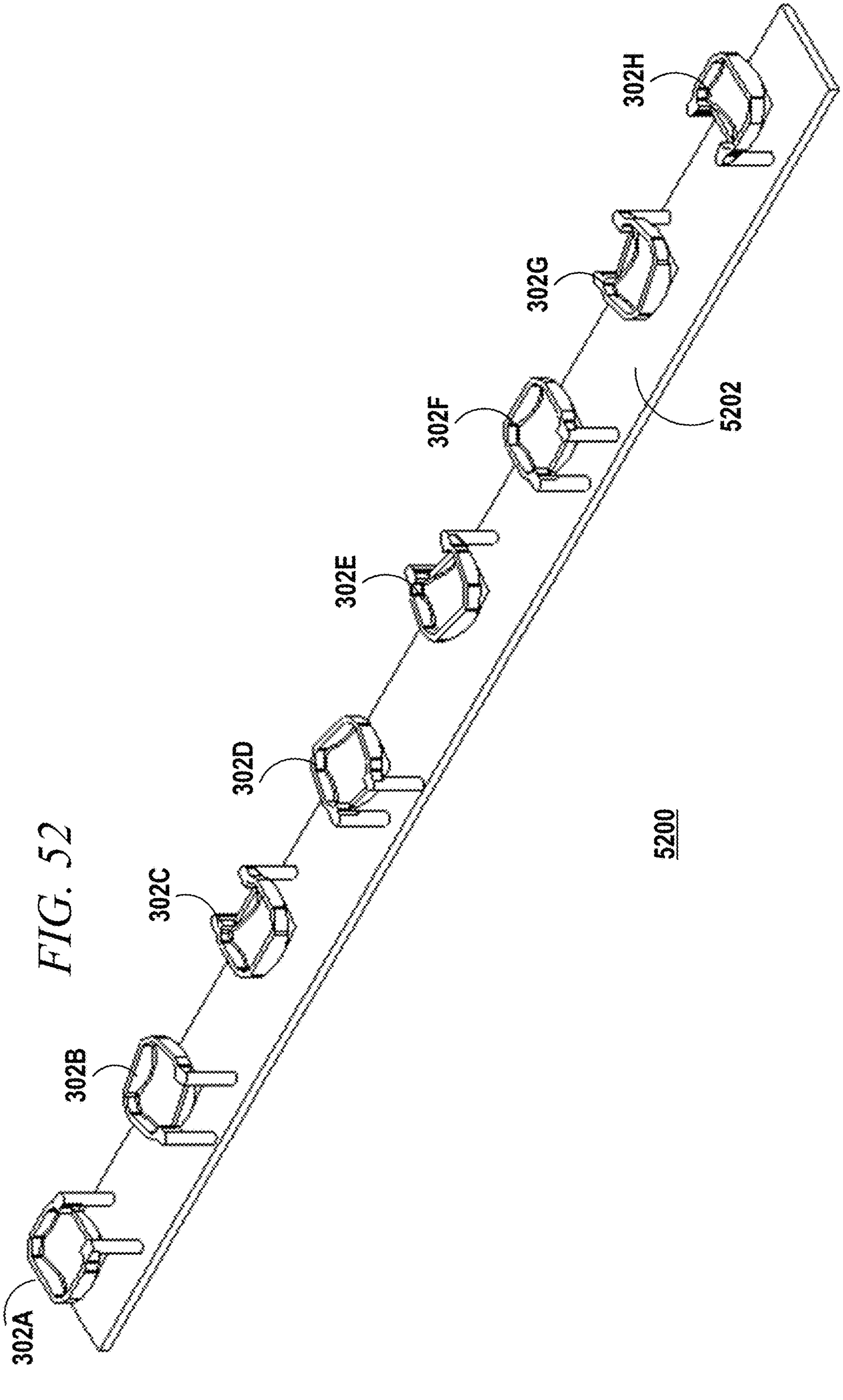
FIG. 52 is an isometric view of an eight element wideband MIMO antenna array according to an embodiment of the invention.
Figure 53:
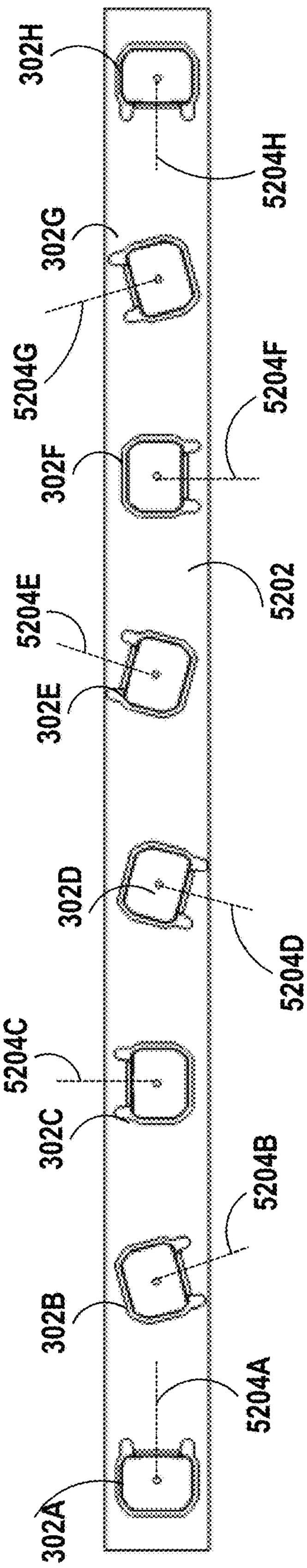
FIG. 53 is a top view of the eight element wideband MIMO antenna array shown in FIG. 52.

FIGS. 52-53 show an eight element wideband MIMO antenna array 5200 according to an embodiment of the invention. FIG. 52 is an isometric view and FIG. 53 is a top view. The array 5200 includes eight first type antenna elements (see FIGS. 7-11) 302A, 302B, 302C, 302D, 302E, 302F, 302G, 302H arranged in a line on a ground plane 5202. In FIG. 53 for each antenna element 302A, 302B, 302C, 302D, 302E, 302F, 302G, 302H a respective azimuthal orientation reference axis 5204A, 5204B, 5204C, 5204D, 5204E, 5204F, 5204G, 5204H which intersects the vertical axis 902 (FIGS. 9-10) and passes symmetrically between the ground shunt conductors 712, 716 (FIGS. 7-11) is shown as dashed line. Measured in the clockwise direction relative to an axis extending to the right from the vertical axis (in the perspective of FIG. 53) and parallel to the longitudinal axis of the array 5200 the reference axes are as follows: 5204A 0°, 5204B 60°, 5204C 270°, 5204D 120°, 5204E 300°, 5204F 90°, 5204G 240°, 5204H 180°. This arrangement avoids having relatively high azimuthal directivity range of any of the elements facing towards any other elements in the array.

Figure 55:
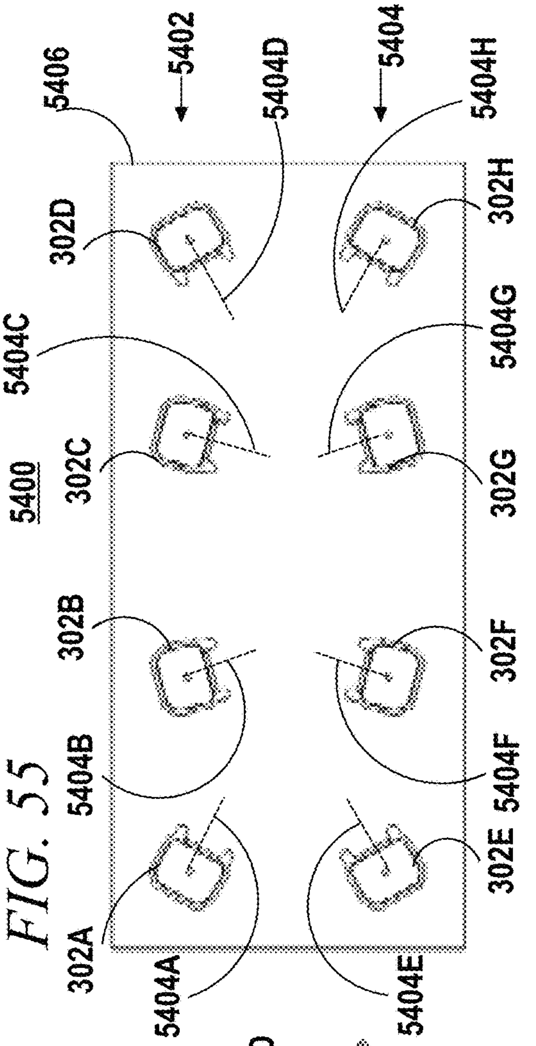
FIG. 55 is a top view of the eight element wideband MIMO antenna array shown in FIG. 54.
Figure 54:
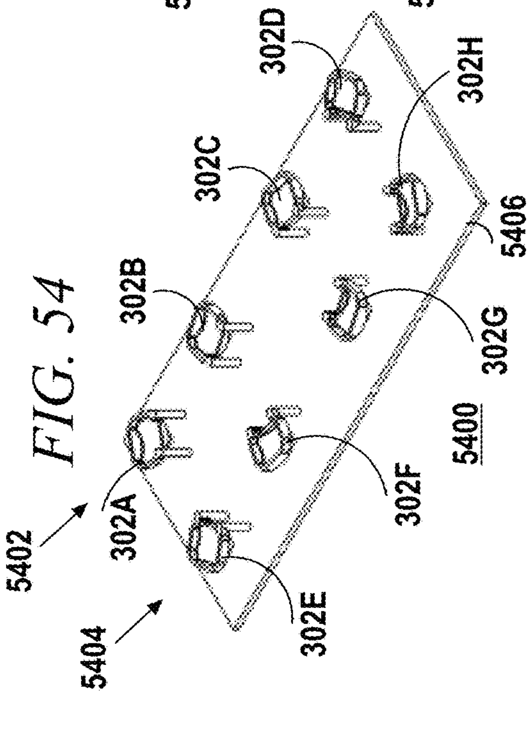
FIG. 54 is an isometric view of an eight element wideband MIMO antenna array according to another embodiment of the invention.

FIGS. 54-55 show an eight element wideband MIMO antenna array 5400 according to another embodiment of the invention. FIG. 54 is an isometric view and FIG. 55 is a top view. The array 5400 is a rectangular 2 by 4 array of the elements 302A, 302B, 302C, 302D, 302E, 302F, 302G, 302H. (It should be noted that reference to rows and columns in the following discussion is for the purpose of the discussion and is arbitrary to the extent that the array can alternatively be viewed as a 4 by 2 array.) However describing the array 5400 as a 2 by 4 array, the array 5400 includes a first row 5402 including four elements 302A, 302B, 302C, 302D and a second row 5404 including four additional elements 302E, 302F, 302G, 302H all of which are arranged over a ground plane 5406. In FIG. 55 for each antenna element 302A, 302B, 302C, 302D, 302E, 302F, 302G, 302H a respective azimuthal orientation reference axis 5404A, 5404B, 5404C, 5404D, 5404E, 5404F, 5404G, 5404H which intersects the vertical axis 902 (FIGS. 9-10) and passes symmetrically between the ground shunt conductors 712, 716 (FIGS. 7-11) is shown as dashed line. Measured in the counterclockwise direction relative to an axis extending to the right from the vertical axis (in the perspective of FIG. 53) and parallel to the longitudinal axis of the array 5200 the reference axes are as follows: 5204A 330°, 5204B 290°, 5204C 250°, 5204D 210°, 5204E 30°, 5204F 70°, 5204G 110°, 5204H 150°. This arrangement also avoids having relatively high azimuthal directivity range of any of the elements facing towards any other elements in the array. Other antenna elements having non-axisymmetric placement of ground shunt conductors such as those shown in FIGS. 21-25, 29, 31, 44 can also be used in the embodiments shown in FIGS. 52-55. In each of the arrays 5200, 5400 shown in FIGS. 52-55 due to the fact that each element is oriented in a different direction the peak directivity produced by each element also faces a different direction.

Figure 56:
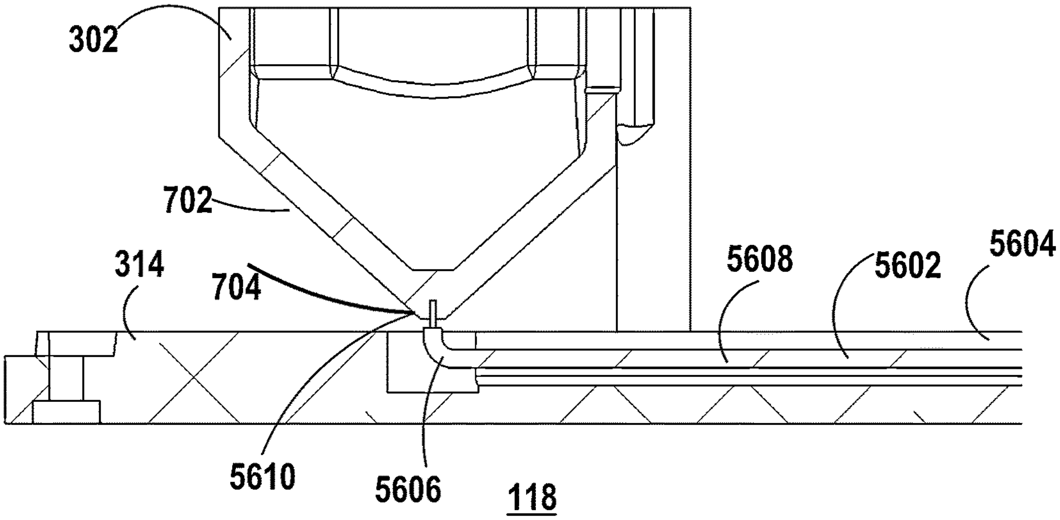
FIG. 56 is a cross-sectional view through a ground plane and antenna element of a wideband MIMO antenna array according to an embodiment of the invention.

FIG. 56 is a cross-sectional view through the ground plane 314 and first first type antenna element 302 of the wideband MIMO antenna array 118 according to an embodiment of the invention. A coaxial cable 5602 runs in a groove 5604 in a top surface of the ground plane 314. An end portion 5606 bends upwards at 90° to the small end 704 of the tapered portion 702. An outer conductor 5608 of the coaxial cable 5602 electrically contacts the ground plane 314. A fastening clip (not shown) or electrically conductive adhesive (not shown) can be used to reinforce the electrical contact between the outer conductor 5608 and the ground plane 314. An inner conductor 5610 of the coaxial cable is inserted into a small axial hole 5612 in the small end 704 of the tapered portion 702 and makes electrical contact with the small end 704 of the tapered portion 702.

In this document, relational terms such as first and second, top and bottom, and the like may be used solely to distinguish one entity or action from another entity or action without necessarily requiring or implying any actual such relationship or order between such entities or actions. The terms “comprises,” “comprising,” or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by “comprises . . . a” does not, without more constraints, preclude the existence of additional identical elements in the process, method, article, or apparatus that comprises the element.

Different numerical labels such as “first”, “second”, “third”, and “fourth” may be used to refer to the very same elements in different contexts herein, for example, in the context of the claims as opposed to the detailed description. Whereas in the detailed description, the numerical labels may be assigned based on the order of physical arrangement of the elements, in the claims the numerical labels may be assigned based on the order of appearance within the a set of claims.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

I claim:

1. A broad band multiple-input, multiple-output antenna array comprising:

a ground plane;

at least a first antenna element disposed proximate said ground plane, a second antenna element disposed proximate said ground plane, and a third antenna element disposed proximate said ground plane wherein each of said first, second and third antenna elements includes:

a tapered portion that includes a first end that is proximal to said ground plane and a second end that is distal to said ground plane and spaced from said first end along a virtual axis wherein the first end has a first maximum dimension measured traverse to said virtual axis and said second end has a second maximum dimension measured traverse to said virtual axis and said first maximum dimension is smaller than said second maximum dimension;

wherein said first antenna element exhibits a first azimuthal directivity pattern having a first peak, said second antenna element exhibits a second azimuthal directivity pattern having a second peak and said third antenna element exhibits a third directivity pattern having a third peak and wherein said first peak, said second peak and said third peak face in different directions;

said first antenna element includes a first ground shunt conductor that extends to said ground plane from a first position distal to said ground plane;

said second antenna element includes a second ground shunt conductor that extends to said ground plane from a second position distal to said ground plane and includes a third ground shunt conductor that extends to said ground plane from a third position distal to said ground plane, wherein said second position and said third position are located symmetrically with respect to said second antenna element;

said third antenna element includes a fourth ground shunt conductor that extends to said ground plane from a fourth position distal to said ground plane; and wherein said first ground shunt conductor, said second ground shunt conductor, and said fourth ground shunt conductor each face in a different direction from one another.

2. The broad band multiple-input, multiple-output antenna array according to claim 1 wherein said first antenna element includes a another ground shunt conductor that extends to said ground plane from another position distal to said ground plane; and wherein said first position and said another position are located asymmetrically with respect to said first antenna element.

3. The broad band multiple-input, multiple-output antenna array according to claim 1 wherein said first antenna element said second antenna element and said third antenna element are arranged in a line.

4. The broad band multiple-input, multiple-output antenna array according to claim 1 further comprising a fourth antenna element wherein said fourth antenna element also includes a tapered portion that includes a first end that is proximal to said ground plane and a second end that is distal to said ground plane and spaced from said first end along a virtual axis wherein the first end has a first maximum dimension measured traverse to said virtual axis and said second end has a second maximum dimension measured traverse to said virtual axis and said first maximum dimension is smaller than said second maximum dimension;

wherein said fourth antenna element exhibits a fourth azimuthal directivity pattern having a fourth peak, wherein said first peak, said second peak, said third peak and said fourth peak face in different directions; and wherein said first antenna element, said second antenna element, said third antenna element, and said fourth antenna element are arranged about a common array center and wherein said first peak, said second peak, said third peak, and said fourth peak are each oriented pointing away from said common array center.

5. The broad band multiple-input, multiple-output antenna array according to claim 4 arranged to form a square array consisting of: said first antenna element, said second antenna element, said third antenna element, and said fourth antenna element arranged in a two by two square.

6. The broad band multiple-input, multiple-output antenna array according to claim 1 further comprising a fourth antenna element disposed proximate said ground plane, wherein said fourth antenna element also includes a tapered portion that includes a first end that is proximal to said ground plane and a second end that is distal to said ground plane and spaced from said first end along a virtual axis wherein the first end has a first maximum dimension measured traverse to said virtual axis and said second end has a second maximum dimension measured traverse to said virtual axis and said first maximum dimension is smaller than said second maximum dimension; and wherein said fourth antenna element exhibits a fourth azimuthal directivity pattern having a fourth peak, wherein said first peak, said second peak, said third peak and said fourth peak face in different directions;

wherein said fourth antenna element includes a fifth ground shunt conductor that extends to said ground plane from a fifth position distal to said ground plane; and wherein said first ground shunt conductor, said second ground shunt conductor, said fourth ground shunt conductor, and said fifth ground shunt conductor each face in a different direction from one another.

7. The broad band multiple-input, multiple-output antenna array according to claim 6 arranged to form a linear array of at least said first antenna element, said second antenna element, said third antenna element, said fourth antenna element arranged in a line.

8. The broad band multiple-input, multiple-output antenna array according to claim 6 arranged to form a square array consisting of: said first antenna element, said second antenna element, said third antenna element, and said fourth antenna element arranged in a two by two square.

9. The broad band multiple-input, multiple-output antenna array according to claim 6 wherein:

said first position is located on a side of said first antenna element facing towards at least two closest of said second antenna element, said third antenna element and said fourth antenna element;

said second position is located on a side of said second antenna element facing towards at least two closest of said first antenna element, said third antenna element and said fourth antenna element;

said third position is located on a side of said third antenna element facing towards at least two closest of said first antenna element, said second antenna element and said fourth antenna element; and said fourth position is located on a side of said fourth antenna element facing towards at least two closest of said first antenna element, said second antenna element and said third antenna element.

10. The broad band multiple-input, multiple-output antenna array according to claim 9 wherein:

said first position is located on a side of said first antenna element facing towards at least one of said second antenna element, said third antenna element and said fourth antenna element;

said second position is located on a side of said second antenna element facing towards at least one of said first antenna element, said third antenna element and said fourth antenna element;

said third position is located on a side of said third antenna element facing towards at least one of said first antenna element, said second antenna element and said fourth antenna element; and said fourth position is located on a side of said fourth antenna element facing towards at least one of said first antenna element, said second antenna element and said third antenna element.

11. The broad band multiple-input, multiple-output antenna array according to claim 6 arranged to form a square array consisting of: said first antenna element, said second antenna element, said third antenna element, and said fourth antenna element arranged in a two by two square.

12. A broad band multiple-input, multiple-output antenna array comprising:

a ground plane;

at least a first antenna element disposed proximate said ground plane, a second antenna element disposed proximate said ground plane, and a third antenna element disposed proximate said ground plane wherein each of said first, second and third antenna elements includes:

a tapered portion that includes a first end that is proximal to said ground plane and a second end that is distal to said ground plane and spaced from said first end along a virtual axis wherein the first end has a first maximum dimension measured traverse to said virtual axis and said second end has a second maximum dimension measured traverse to said virtual axis and said first maximum dimension is smaller than said second maximum dimension;

wherein said first antenna element exhibits a first azimuthal directivity pattern having a first peak, said second antenna element exhibits a second azimuthal directivity pattern having a second peak and said third antenna element exhibits a third directivity pattern having a third peak and wherein said first peak, said second peak and said third peak face in different directions;

said first antenna element includes a first ground shunt conductor that extends to said ground plane from a first position distal to said ground plane;

said second antenna element includes a second ground shunt conductor that extends to said ground plane from a second position distal to said ground plane;

said third antenna element includes a third ground shunt conductor that extends to said ground plane from a third position distal to said ground plane;

wherein said first ground shunt conductor, said second ground shunt conductor, and said third ground shunt conductor each face in a different direction from one another;

a fourth antenna element disposed proximate said ground plane, a fifth antenna element disposed proximate said ground plane, a sixth antenna element disposed proximate said ground plane, a seventh antenna element disposed proximate said ground plane, and an eighth antenna element disposed proximate said ground plane, wherein each of said fourth, fifth, sixth, seventh and eighth antenna elements includes:

a tapered portion that includes a first end that is proximal to said ground plane and a second end that is distal to said ground plane and spaced from said first end along a virtual axis wherein the first end has a first maximum dimension measured traverse to said virtual axis and said second end has a second maximum dimension measured traverse to said virtual axis and said first maximum dimension is smaller than said second maximum dimension and a ground shunt conductor that extends to said ground plane from a position distal to said ground plane;

wherein said fourth antenna element exhibits a fourth azimuthal directivity pattern having a fourth peak, said fifth antenna element exhibits a fifth azimuthal directivity pattern having a fifth peak, said sixth antenna element exhibits a sixth directivity pattern having a sixth peak, said seventh antenna element exhibits a seventh directivity pattern having a seventh peak, said eighth antenna element exhibits an eighth directivity pattern having an eight peak and wherein said first peak, said second peak, said third peak, said fourth peak, said fifth peak, said sixth peak, said seventh peak and said eighth peak face in different directions; and wherein said first ground shunt conductor, said second ground shunt conductor, said third ground shunt conductor and the ground shunt conductors of the fourth, fifth, sixth, seventh, and eighth antenna elements each face in a different direction from one another.

13. The broad band multiple-input, multiple-output antenna array according to claim 12 arranged to form a linear array of: said first antenna element, said second antenna element, said third antenna element, said fourth antenna element, said fifth antenna element, said sixth antenna element, said seventh antenna element and said eighth antenna element arranged in a line.

14. The broad band multiple-input, multiple-output antenna array according to claim 12 arranged to form a rectangular array of: said first antenna element, said second antenna element, said third antenna element, said fourth antenna element, said fifth antenna element, said sixth antenna element, said seventh antenna element and said eighth antenna element arranged in a two by at least four rectangle.

* * * * *